US010535064B2

(12) United States Patent
Gordon et al.

(10) Patent No.: US 10,535,064 B2
(45) Date of Patent: Jan. 14, 2020

(54) SYSTEMS AND METHODS FOR REAL-TIME ACCOUNT ACCESS

(71) Applicant: PayNet Payments Network, LLC, Jacksonville, FL (US)

(72) Inventors: Peter Gordon, Sharon, MA (US); Neil Marcous, Bay Head, NJ (US); Robert Woodbury, Flemington, NJ (US)

(73) Assignee: PayNet Payments Network, LLC, Jacksonville, FL (US)

( * ) Notice: Subject to any disclaimer, the term of this patent is extended or adjusted under 35 U.S.C. 154(b) by 242 days.

(21) Appl. No.: 14/081,590

(22) Filed: Nov. 15, 2013

(65) Prior Publication Data

US 2014/0074724 A1 Mar. 13, 2014

Related U.S. Application Data

(63) Continuation-in-part of application No. 13/835,452, filed on Mar. 15, 2013.

(Continued)

(51) Int. Cl.
*G06Q 20/40* (2012.01)
*G06Q 20/38* (2012.01)
(Continued)

(52) U.S. Cl.
CPC ....... *G06Q 20/3829* (2013.01); *G06Q 20/023* (2013.01); *G06Q 20/10* (2013.01); *G06Q 20/40* (2013.01)

(58) Field of Classification Search
CPC ............. G06Q 20/02; G06Q 20/3829; G06Q 20/3823; G06Q 20/38215; G06Q 20/401; G06Q 20/40975

(Continued)

(56) References Cited

U.S. PATENT DOCUMENTS 5,809,144 A   9/1998  Sirbu et al.
5,826,241 A  10/1998  Stein et al.
(Continued)

FOREIGN PATENT DOCUMENTS

CN   20068004056.3    10/2009
WO   WO 01/43084 A2   6/2001
(Continued)

OTHER PUBLICATIONS

American Express Global Credit Authorization Guide ISO 8583: 1993 (Version 1)—Apr. 2011.*

(Continued)

*Primary Examiner* — Arunava Chakravarti
(74) *Attorney, Agent, or Firm* — Finnegan, Henderson, Farabow, Garrett & Dunner, LLP

(57) ABSTRACT

Systems, methods, and computer-readable media are provided for processing and settling financial transactions. An example method comprises receiving a transaction from an originator. The transaction comprises information associated with an identification of an initiating user or the account. The method comprises determining the actual account number, transmitting a financial services transaction request comprising the actual account number to a financial institution, receiving a response, and transmitting a response back to the originator. Another method comprises receiving, from a user device, a request to associate a financial account with a user account. The method comprises generating and sending an association message to a payment network and receiving a key associated with the financial account for use in initiating financial transactions. Another method comprises utilizing such a key to generate and process a transaction request. Other systems, methods, and media are also provided.

29 Claims, 8 Drawing Sheets

Related U.S. Application Data

(60) Provisional application No. 61/612,897, filed on Mar. 19, 2012.

(51) Int. Cl.
  *G06Q 20/10* (2012.01)
  *G06Q 20/02* (2012.01)

(58) Field of Classification Search
  USPC .................................................. 705/36–44
  See application file for complete search history.

(56) References Cited

U.S. PATENT DOCUMENTS

| | | | |
|---|---|---|---|
| 5,878,141 | A | 3/1999 | Daly et al. |
| 6,047,268 | A | 4/2000 | Bartoli et al. |
| 7,793,829 | B2 | 9/2010 | Randazza et al. |
| 7,805,378 | B2 | 9/2010 | Berardi et al. |
| 7,831,490 | B2 | 11/2010 | Modigliani et al. |
| 7,945,511 | B2 | 5/2011 | O'Brien et al. |
| 7,988,040 | B2 | 8/2011 | Randazza et al. |
| 8,041,646 | B2 | 10/2011 | Bajan |
| 8,205,791 | B2 | 6/2012 | Randazza et al. |
| 8,271,381 | B2 | 9/2012 | O'Brien et al. |
| 8,393,536 | B2 | 3/2013 | Randazza et al. |
| 8,490,865 | B2 | 7/2013 | Randazza et al. |
| 8,543,495 | B1 | 9/2013 | Bajan |
| 2001/0032139 | A1 | 10/2001 | Debonnett |
| 2001/0034720 | A1 | 10/2001 | Armes |
| 2002/0133467 | A1 | 9/2002 | Hobson et al. |
| 2003/0126094 | A1 | 7/2003 | Fisher et al. |
| 2005/0171898 | A1* | 8/2005 | Bishop et al. .................. 705/39 |
| 2006/0026098 | A1 | 2/2006 | Peckover et al. |
| 2006/0149688 | A1 | 7/2006 | Debonnett |
| 2008/0167017 | A1 | 7/2008 | Wentker et al. |
| 2008/0319869 | A1 | 12/2008 | Carlson et al. |
| 2009/0065572 | A1* | 3/2009 | Jain ............................... 235/379 |
| 2009/0106152 | A1* | 4/2009 | Dill et al. ....................... 705/44 |
| 2009/0119209 | A1 | 5/2009 | Sorensen et al. |
| 2010/0250436 | A1* | 9/2010 | Loevenguth et al. .......... 705/44 |
| 2011/0093386 | A1* | 4/2011 | Phillips et al. ................. 705/39 |
| 2011/0208600 | A1 | 8/2011 | Aharoni et al. |
| 2011/0208659 | A1* | 8/2011 | Easterly ............... G06Q 20/027 705/79 |
| 2011/0270757 | A1* | 11/2011 | Hammad ............... G06Q 30/06 705/44 |
| 2012/0016799 | A1 | 1/2012 | Killian et al. |
| 2012/0041876 | A1 | 2/2012 | Nosek et al. |
| 2012/0123940 | A1 | 5/2012 | Killian et al. |
| 2012/0246080 | A1 | 9/2012 | Bajan |
| 2013/0191290 | A1* | 7/2013 | Glendenning ......... G06Q 20/20 705/71 |
| 2013/0226799 | A1 | 8/2013 | Raj |
| 2015/0120556 | A1* | 4/2015 | Brickell ............... G06Q 20/385 705/44 |

FOREIGN PATENT DOCUMENTS

| | | |
|---|---|---|
| WO | WO 2001/065502 A2 | 9/2001 |
| WO | WO 03/075192 A1 | 9/2003 |
| WO | WO 2007/056274 | 5/2007 |
| WO | WO 2009/003030 A2 | 12/2008 |
| WO | WO 2009/133116 A1 | 11/2009 |

OTHER PUBLICATIONS

International Standard: ISO 8583-1: Financial transaction card originated messages—Interchange message specifications—Part 1: Messages, data elements and code values, Jun. 15, 2003.*
Press Release: "MasterCard, Visa and American Express Propose New Global Standard to Make Online and Mobile Shopping Simpler and Safer," http://newsroom.mastercard.com/press-releases/mastercard-visa-and-american-express-propose-new-global-standard-to-make-online-and-mobile-shopping-simpler-and-safer/, Oct. 1, 2013 (2 pages).
International Search Report and Written Opinion for International Application PCT/US2013/032130, dated Jun. 5, 2013 (16 pages).
Search History for International Application PCT/US2013/032130, dated May 20, 2013 (3 pages).
POS Check Service—Electronic Check Conversion, Visa U.S.A.. Jun. 2007 (4 pages).
Extended European Search Report for Application No. 14193092.5, dated Mar. 20, 2015 (10 pages).
First Notification of Office Action from State Intellectual Property Office of China, in Chinese Patent Application No. 201380026008.9, dated Oct. 8, 2016, with English translation (41 pages).
Examination report No. 3 for Australian Application No. 2013235387; dated Aug. 8, 2018 from Australian Patent Office; pp. 1-5.
Examiner Search Report for Canadian Application No. 2,867,697, dated Jan. 9, 2019 (3 pages).
Decision of Rejection in Chinese Application No. 201380026008.9, and English Translation thereof, dated Nov. 2, 2018 (10 pages).
First Office Action in Chinese Application No. 201410640355.7, and English translation thereof, dated Jan. 11, 2019 (14 pages).
Results of Substantive Examination from Mexican Institute of Industrial Property, in Mexican Patent Application No. MX/a/2014/013530 dated Nov. 17, 2017, with English translation (13 pages).
Results of Substantive Examination from Mexican Institute of Industrial Property, in Mexican Patent Application No. MX/a/2014/013530 dated May 12, 2017, with English translation (12 pages).
Results of Substantive Examination from Mexican Institute of Industrial Property, in Mexican Patent Application No. MX/a/2014/011114 dated Jan. 16, 2017, with English translation (4 pages).
Notice of Second Examination Opinion from State Intellectual Property of the Peoples Republic of China, in Chinese Patent Application No. 201380026008.9, dated May 15, 2017, with English translation (48 pages).
Examination Report No. 1 from IP Australia, in Australian Patent Application No. 2013235387, dated Aug. 25, 2017 (3 pages).
Notice of Reexamination in Chinese Patent Application No. 201380026008.9; dated Oct. 24, 2019 (20 pages) (with translation).
Examination report No. 1 in Australian Patent Application No. 2014256396; dated Sep. 26, 2019 (7 pages).
Examination report No. 1 in Australian Patent Application No. 2018220030; dated Sep. 27, 2019 (3 pages).
Preliminary opinion from the European Patent Office, in European Application No. 13 763 868.0; dated Oct. 4, 2019 (15 pages).
2nd Notification of Office Action, in Chinese application 201410640355.7, dated Aug. 16, 2019 (with translation) (17 pages).

* cited by examiner

SYSTEMS AND METHODS FOR REAL-TIME ACCOUNT ACCESS

CROSS-REFERENCE TO RELATED APPLICATIONS

This application is a continuation-in-part of and claims priority from U.S. patent application Ser. No. 13/835,452, filed Mar. 15, 2013, which claims priority to U.S. Provisional Application No. 61/612,897, filed Mar. 19, 2012, both of which are hereby incorporated by reference in the present application.

FIELD OF DISCLOSURE

Disclosed embodiments are generally directed to systems and methods for real-time account access.

BACKGROUND

Network processing infrastructures, such as EFT (Electronic Funds Transfer) network processing, are used to process payments from traditional credit card or debit card transactions. EFT enables provisioning of account information and other related information for debits, credits, account-to-account transfers, purchases, bill payments, and other purposes. For example, when a cardholder seeks to purchase an item at a store, the cardholder will generally hand her card to the merchant and the merchant will swipe the card through a terminal capable of reading magnetic stripe information to read the card information. Card information includes, for example, a card number, expiration date, and cardholder name. Card numbers are typically 13-19 digits long, and uniquely identify the user's credit or debit account.

After the card number is captured by the merchant's terminal, the merchant's terminal sends information about the card and the transaction, such as, for example, the card number, the expiration date, the cardholder name, the transaction price, the transaction date, the transaction time, and the transaction location, to a payment network. The first set of digits in the card number typically identifies the payment company or registration authority that licensed or registered the card prefix to the "issuer" (for example, the financial institution that issued the card). So, for example, a card number beginning with a '4,' e.g., 4000 1234 5678 9012, identifies VISA as the payment company that licensed the card prefix to a particular card issuer. Each financial institution issuer typically has a set of numeric identifiers (card prefixes) that are used on it's the cards that it issues (for example, a number of leading digits in the card number). The payment network routes the information received from the merchant's terminal to the appropriate card issuer based on the card number.

The appropriate issuer (in the case of a card transaction, a financial institution or its contracted transaction authorization processor) will then consult its records to determine the appropriate account and verify whether that account contains sufficient funds or credit available to authorize a transaction (e.g., a purchase). The result of this determination is returned to inform the merchant whether the cardholder is able to purchase the item.

However, this process requires that the cardholder give a potentially untrusted entity (the merchant) a uniquely identifiable card number. A nefarious merchant employee or an unauthorized person intercepting the card data may try to reuse the card number without permission of the cardholder, for example, to purchase items for himself or to obtain cash at an ATM.

Further, in some situations, a card number for accessing a customer's account is not available. For example, if a customer decides to pay by check, the merchant must capture the RTN (Routing Transit Number) for the financial institution that issued the check and the customer's personal account number. The merchant must then use a service provided by a bank or check acceptance provider to access the Automated Clearing House (ACH), request that the check be cleared, and request a credit. The ACH system is batch-driven and thus the process to fund a purchase can take much longer than a card-based transaction. Thus, using checks as payment increases the amount of time for the merchant to acquire the promised funds. ACH use further includes a possibility of accepting payments that are later found to be uncollectable (also known as a "bounced check"). Check guarantee providers can be used by merchants to reduce this risk. However, such providers typically charge a high percentage of the check amount, making this service potentially more expensive than a credit or debit card payment.

Improvements in techniques for processing financial transactions are desirable.

SUMMARY

In one disclosed embodiment, a first method is disclosed for processing financial transactions at a payment network. The method comprises receiving, from an originator device, a transaction request associated with an initiating user and a financial institution account. The transaction request comprises information associated with an identification of the initiating user or the financial institution account. The method further comprises determining an account identifier for the account based on the identification, and transmitting, over a network, a financial services transaction comprising the account identifier associated with the account to a financial institution associate with the account. The method further comprises receiving, from the financial institution, a response to the financial services transaction, and transmitting a response to the transaction request to the originator device.

A system is also disclosed for processing financial transactions. The system comprises a processor system (i.e., one or more electronic processors) and a memory that stores instructions. When executed, the instructions cause the processor system to perform the above first method.

In another disclosed embodiment, a second method is disclosed for associating a financial institution account and an originator account. The method comprises receiving from a user device a request to associate a financial institution account with an originator account. The method further comprises generating an association message including details about the financial institution account, and sending the association message to a payment network. The method comprises receiving an association response, determining whether the association response includes a key associated with the financial account, and if so, storing the received key for use in initiating transaction requests and sending an indication to the user device that the accounts are associated.

A system is also disclosed for associating a financial institution account and an originator account. The system comprises a processor system (i.e., one or more electronic funds transaction processors) and a memory that stores instructions. When executed, the instructions cause the processor system to perform the above method.

In another disclosed embodiment, a third method is disclosed for processing transaction requests. The method comprises receiving a transaction request from an associated device. The transaction request comprises a request to initiate a transaction on behalf of a user and information on a financial account. The transaction request does not include an account number associated with the financial account. The method further comprises incrementing a transaction counter associated with the financial account, determining a key associated with the financial account, and generating a financial services transaction message. The financial services transaction message includes a cryptogram. The cryptogram is based on the determined key, information from the transaction request, and the transaction counter. The method further comprises sending the financial services transaction message to a payment network for processing.

A system is also disclosed for processing financial transactions. The system comprises a processor system (i.e., one or more electronic funds transaction processors) and a memory that stores instructions. When executed, the instructions cause the processor system to perform the above third method.

In another disclosed embodiment, a fourth method is disclosed for processing transaction requests. The method comprises receiving a transaction request from an associated device. The transaction request comprises a request to initiate a transaction on behalf of a user and information on a financial account. The method further comprises incrementing a transaction counter associated with the financial account, determining a key associated with the financial account, and generating a financial services transaction message. The transaction message includes a cryptogram generated based on the determined key, information from the transaction request, and the transaction counter. The method further comprises sending the financial services transaction message to a payment network.

A system is also disclosed for processing financial transactions. The system comprises a processor system (i.e., one or more electronic funds transaction processors) and a memory that stores instructions. When executed, the instructions cause the processor system to perform the above fourth method.

In another disclosed embodiment, a fifth method is disclosed for processing transaction requests. The method comprises receiving a transaction request from an originator. The transaction request includes a cryptogram and does not include an account number of the financial institution account. The method comprises determining a key associated with the financial institution account and validating the cryptogram using the key associated with the financial institution account. The method further comprises determining an account identifier of the financial institution account, generating a transaction request based on information stored in the cryptogram and the determined account identifier, sending the transaction request to a financial institution, and receiving a response. The method further comprises by sending a response to the originator.

A system is also disclosed for processing financial transactions. The system comprises a processor system (i.e., one or more electronic funds transaction processors) and a memory that stores instructions. When executed, the instructions cause the processor system to perform the above fifth method.

Additional aspects related to the embodiments will be set forth in part in the description which follows, and in part will be obvious from the description, or may be learned by practice of the embodiments. The accompanying drawings, which are incorporated in and constitute a part of this specification, illustrate a variety of embodiments and together with the description, serve to explain the principles of the embodiments. It is to be understood that both the foregoing general description and the following detailed description are exemplary and explanatory only and are not restrictive of the invention, as claimed.

DESCRIPTION OF THE EMBODIMENTS

Reference will now be made in detail to embodiments of the disclosure, examples of which are illustrated in the accompanying drawings. Wherever possible, the same reference numbers will be used throughout the drawings to refer to the same or like parts.

Embodiments of the disclosure enable, for example, processing of financial transactions using payment networks. For example, a payment network may receive a transaction from an originator, such as a merchant or bank. The transaction may comprise information associated with an identification of an initiating user or a financial institution account. The transaction, however, does not necessarily contain an account number associated with the financial institution account. Using the identification information, the payment network can determine an account identifier, and generate and send a financial services transaction request to a financial institution. The payment network can then receive a response to the financial services transaction request from the financial institution, and can transmit a response back to the originator. Other embodiments and variations are explained herein.

Figure 1:
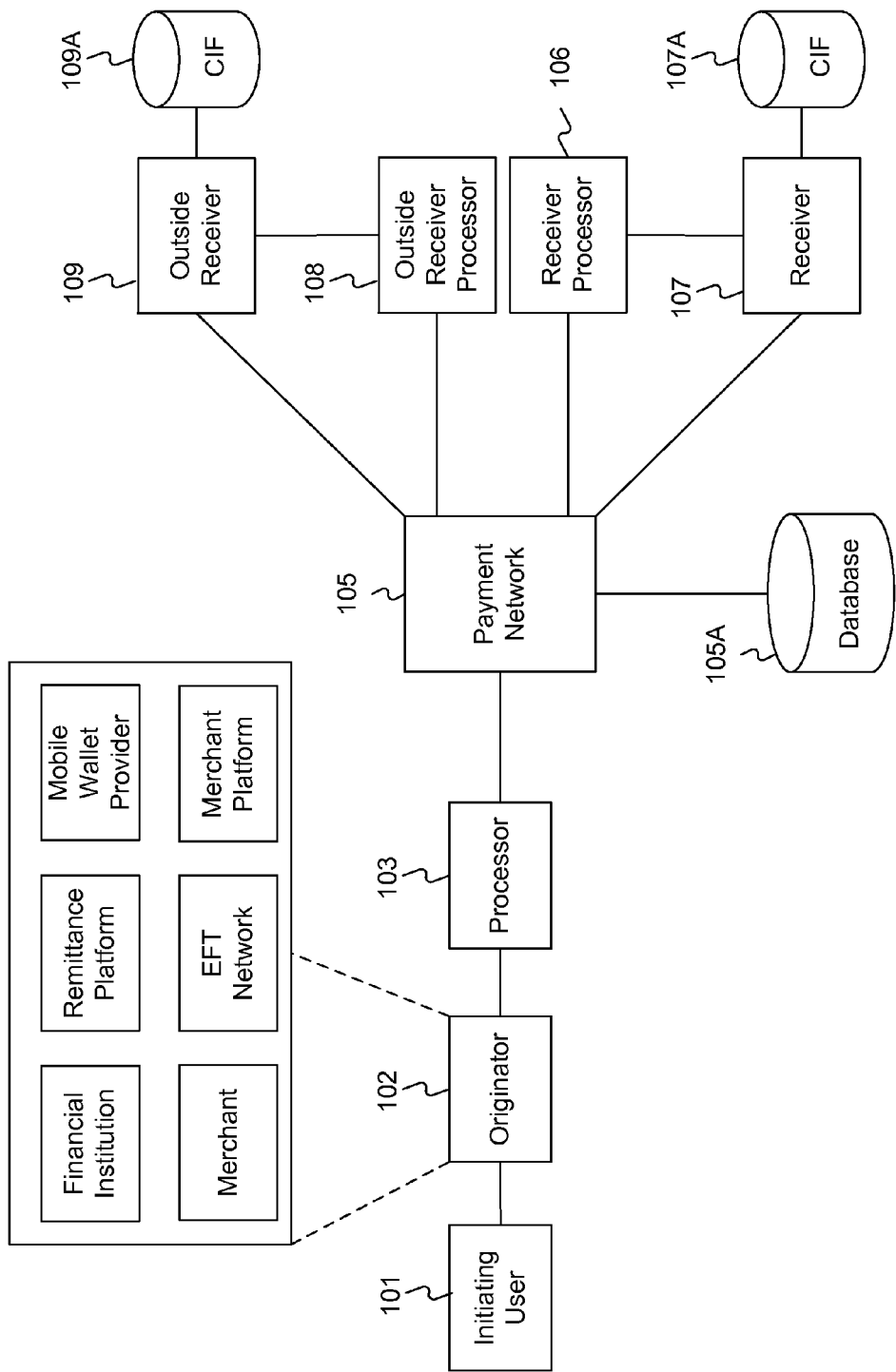
FIG. 1 illustrates an example network of devices for implementing embodiments of the disclosure.

FIG. 1 illustrates an example of a particular network for implementing embodiments of this disclosure. The network illustrated in FIG. 1 includes blocks representing an initiating user 101, an originator 102, a processor 103, a payment network 105, a database 105A, a receiver processor 106, a receiver 107, a Customer Information File (CIF) 107A, an outside receiver processor 108, an outside receiver 109, and a CIF 109A. Each block illustrated in FIG. 1 may be implemented using software, hardware, firmware, or a combination thereof.

Initiating user 101 represents a user that wants to initiate a transaction using originator 102. Initiating user 101, in some embodiments, uses a device, such as a cellphone or computer, which may store and execute a transaction origination application. The application enables initiating user 101 to originate a transaction, such as an online purchase, a bill payment, or the like. The transaction origination application also enables the sending of credentials associated with initiating user 101 to initiate such transactions. Initiating user 101, in other embodiments, represents a consumer that provides a payment device or token (like a username or other identifier) to originator 102, in order to effect the transaction.

Originator 102 represents an entity that initiates financial services transaction requests on behalf of initiating user 101. Financial services transaction requests can take many forms. In some embodiments, requests can include balance requests (a request for the current balance in an account), check authorization requests (to determine whether an account has sufficient funds for a purchase made by check), account funding requests (to request that a new account be funded using a current account), account validation or health requests (to determine whether information about a financial institution account proffered by initiating user 101 is valid, open, in collection, in good standing, etc.), international remittance funding requests, bill payment funding requests, person-to-person (P2P) funds transfer requests, withdrawal requests, purchase requests, refund requests, various credit requests (loan proceeds, insurance proceeds, etc.) transaction reversal/adjustment requests, or the like.

Originator 102 can be any of a financial institution, an Electronic Funds Transfer (EFT) network, a merchant or a merchant processor, a remittance platform, a payment service, a mobile wallet provider, a mobile pre-paid remittance service, or the like. Financial institutions include, for example, banks, savings banks, credit unions, brokerage firms, or mutual funds providers. Financial institutions can, for example, process transactions on behalf of initiating user 101 or other entities or transfer money between accounts at the financial institution and/or accounts outside of the financial institution. Unlike payment networks, financial institutions manage accounts on behalf of users, for example, by maintaining records of deposits and withdrawals on the account, and maintaining a record of a balance on the account.

Merchants include, for example, brick and mortar merchants, online or electronic merchants, or service providers that bill users for services, such as wireless phone carriers, utility companies, insurance providers, or local, state or federal government entities. In some embodiments, merchants are equipped to initiate financial services transactions by themselves. However, in other embodiments, merchants may utilize a merchant processor for that purpose. Merchant processors receive financial transaction details from merchants and generate corresponding financial services transactions on behalf of the merchants. In other words, merchants may communicate financial transaction details to a merchant processor, and the merchant processor may create the financial services transaction for sending to the payment network.

EFT networks include interbank networks and other electronic fund transfer networks, which enable transfer of funds between different banks. EFT networks, in some embodiments, transfer money using batch Automated Clearing House (ACH) transactions.

Remittance platforms include systems for sending money from person to person. As one example of a known remittance platform, the Western Union system enables one person to deposit money into the system and another user to pick up that money at another location in the system. One of ordinary skill will understand that other types of remittance platforms are possible as well.

Mobile wallet providers include systems that enable initiating user 101 to utilize a mobile device to transmit account details (such as a Routing Transit Number (RTN) and account number or alias information for the account) to a merchant. In some embodiments, mobile wallet providers provide mobile applications to initiating user 101 that enable initiating user 101 to initiate a transaction with a merchant or originator.

Originator 102 receives instructions from initiating user 101 requesting that a financial transaction take place. Originator 102 generates and sends a financial services transaction to another device or entity, the request including information associated with the financial services transaction requested by initiating user 101. As one example, originator 102 (e.g., a first financial institution) may receive instructions from an accountholder to send money to an account at a second financial institution. Originator 102 generates a financial services transaction and sends it to processor 103.

Originator 102 may receive credentials from initiating user 101 to initiate a financial services transaction. Credentials from initiating user 101 include one or more forms of information used to identify initiating user 101. Credentials can include at least one of a physical token (such as an electronic device or payment card-like mechanism), information that initiating user 101 knows (such as a social security number, user name, email address, date of birth, password or PIN, or the like), information that initiating user 101 has (such as a dynamically generated string of characters), or the like.

In some embodiments, originator 102 represents an entity that initiating user 101 contacts in advance in order to register as a user. Initiating user 101 may provide credential information such as information associated with a deposit account at a financial institution, or identifying information such as a name, address, social security number, or date of birth, in order to register with originator 102. This registration process may comprise initiating user 101 establishing new credential information for a relationship between initiating user 101 and originator 102 (such as a user ID and password established specifically for initiating transactions with originator 102). Later, when receiving instructions for a financial transaction from initiating user 101, initiating user 101 can provide those credentials to originator 102, originator 102 can perform a lookup in a database to determine information necessary to process the instructions, and originator 102 may then determine how to initiate a respective financial services transaction, and may generate a financial services transaction request corresponding to the transaction.

In some embodiments, originator 102 may be a "sponsored entity." Sponsored entities are entities that are not financial institutions but are "sponsored" by a financial institution that has a relationship with payment network 105. A financial institution that "sponsors" a sponsored entity assumes all liability for the actions or inactions of the sponsored entity, including all payment network transactions initiated by the sponsored entity. An example of a sponsored entity would be a merchant. Settlement liability for funds associated with transactions would be assumed by the financial institution sponsoring that merchant.

In one mode of operation, "native mode," originator 102 creates a financial services transaction request complying with a known standard, for example, the ISO 8583 standard. ISO 8583 is a standard communications format for systems that exchange electronic transactions made by cardholders using payment cards. In typical ISO 8583 messages, the primary account number (PAN) (such as, for example, a card number corresponding to the account that a user is using to pay for a purchase) is included in a field known as the "PAN field." In some embodiments, this PAN field may range from 13 digits to 19 digits in length. In some embodiments, payment cards and payment numbers are not used by originator 102 in processing financial services transactions. In these embodiments, originator 102 generates financial services transaction requests that comply with the ISO 8583 standard, but do not include a payment card number in the PAN field. In native mode, the financial services transaction request includes alternate information in the PAN field. This information is referred to as the "RTA" ("Routing Transit and Account number;" also known as the "Account Routing Number" (ARN) or "constructed PAN"). The RTA comprises a value (for example, '59') that indicates that the digits following the value should be interpreted as account information rather than a card number. The RTA also comprises account information identifying at least one accountholder's account. The RTA may be stored in the financial services transaction request as:

| 5 | 9 | x | x | x | x | x | x | x | x | x | y | y | y | y | y | y | y | y |
|---|---|---|---|---|---|---|---|---|---|---|---|---|---|---|---|---|---|---|

Each 'x' in the above table signifies a digit in a Routing Transit Number ("RTN," also known as an "American Bankers Association number" or "ABA number") associated with the financial institution that manages or maintains the account of initiating user 101. Each 'y' in the table indicates a digit of the account associated with initiating user 101. In some embodiments, the full account number is included in the RTA, while in other embodiments only a portion of the account number (such as the right-most eight digits of the account number) is stored in the string, with the remaining digits of the account number, or the account number itself, included in another field in the financial services transaction. The length and makeup of the RTA may vary in some embodiments.

If initiating user 101 initiates a financial services transaction through originator 102 to pay for a purchase, the 'x' digits in the RTA may include the routing number associated with an account of initiating user 101 and the 'y' digits in the RTA may include at least some of the account number associated with the account of initiating user 101.

In a second mode, "cross-reference" or "X-REF," originator 102 generates a financial services transaction request that includes identifying information that is associated with a financial institution account. However, neither the RTN nor the account number is included in the financial services transaction request. Rather, identifying information may be included in the form of an Account Access Token (AAT). AATs enable unique identification of a user's account at a financial institution but do not directly include the account information for that account. Rather, AATs include identifying information such as a username, personally-identifying information (e.g., a social security number, a name, an address, an email address, a phone number, a login ID), a substitute account number (e.g., a number that resembles a valid account number but is not the actual account number for the account), or the like. AATs may be generated on behalf of initiating user 101 by a variety of entities. For example, in some embodiments, AATs are generated by at least one of originator 102, payment network 105, receiver 107, or outside receiver 109. In other embodiments, AATs are generated by another entity such as a central bank or monetary authority (e.g., the U.S. Federal Reserve or the European Central Bank). In other embodiments, AATs are generated by a party that is authorized by payment network 105 to generate AATs (an "authoritative party").

In some embodiments, financial services transaction requests may be generated in XML format, or comply with a standard like ISO 20022 or ISO 8583. Financial services transaction requests generated by originator 102 include one or ore types of transactions. While some examples are provided herein, one of skill will understand that other types of financial services transactions can be generated by originator 102.

As a first example, financial services transaction requests generated by originator 102 indicate a request for the current balance of an account referenced by initiating user 101. If originator 102 is a merchant, initiating user 101 may attempt to pay for a purchase with a check. Originator 102 may generate a request to determine whether or not it should accept the check. The transaction request may comprise the amount of the check that initiating user 101 has written and offered to originator 102 for payment and an identifier associated with the account. Originator 102 may receive a response as to whether the check will clear based on the funds available at that moment in time, and can decline or approve the transaction from initiating user 101.

As a second example, financial services transaction requests generated by originator 102 indicate a request to validate the ownership or existence of a particular account. In this example initiating user 101 may attempt to associate an account at originator 102 and a financial institution account owned by initiating user 101 (e.g., a bank account). Initiating user 101 may proffer financial institution account details (e.g., an account number) to originator 102 in order to set up the originator account. Originator 102 may generate a request to validate the existence and/or ownership of the financial institution account. The transaction request may comprise an identity associated with the financial institution account. Originator 102 may then receive a response confirming or denying that the financial institution account is in existence and/or is actually owned by initiating user 101. If confirmed, this enables initiating user 101 to initiate transactions using the account at originator 102.

As a third example, financial services transaction requests generated by originator 102 indicate a request to send a credit to an account referenced by initiating user 101. If originator 102 is a remittance platform (e.g., a platform for sending money from one person to another person), initiating user 101 may request that a particular amount of money be deposited in the referenced account or made available via another disbursement method to a second user. Initiating user 101 may give details of the destination account to originator 102, such as an RTN and account number, a username or address associated with the second user, or other information associated with the destination account or its owner. Originator 102 may generate a request to credit the account referenced by initiating user 101 or make the requested funds available to the second user. The transaction request may comprise an identity of the account and the amount by which initiating user 101 wishes to credit the account. Originator 102 may then receive a response indicating whether the credit was successful.

As a fourth example, financial services transaction requests generated by originator 102 indicate a request to debit funds from an account referenced by initiating user 101. In this example initiating user 101 may attempt to pay a bill issued by originator 102 by providing account information. Initiating user 101 may give details of the source account to originator 102, such as an RTN and/or account number. Originator 102 may generate a request to debit the account referenced by initiating user 101. The transaction request may comprise an identity of the account and the amount by which initiating user 101 wishes to debit the account. Originator 102 may then receive a response indicating whether the debit was successful.

As a fifth example, financial services transaction requests generated by originator 102 include exception requests. In some embodiments, originator 102 can generate an exception request upon determining that there is a discrepancy between a settlement amount received from payment network 105 and an amount that originator 102 believes it should have received. For example, originator 102 can initiate an adjustment exception request (a request to correct a financial position of originator 102 based on an error associated with a particular transaction, within 10 calendar days of that transaction's settlement date), a representment exception request (a dispute to a chargeback initiated by receiver 107), a good faith adjustment request (a request to correct a balance of originator 102 based on an error associated with a particular transaction, for example, more than 45 days after the transaction's settlement date), a late adjustment exception request (a request to correct a balance of originator 102 based on an error associated with a particular transaction, for example, more than 10 days after but within 45 days of the transaction's settlement date), or the like.

Originator 102 may also be associated with one or more Transaction Originator Points (TOPs). TOPs enable initiating user 101 to send information on accounts owned by initiating user 101 to originator 102 and to effect transactions using originator 102. So, for example, if originator 102 provides a mobile wallet for use by users, the associated TOP could be a wallet provider application that receives instructions to pay for a purchase on a mobile device. As another example, if originator 102 is a wireless service provider, the associated TOP could be a bill payment website or a mobile bill payment application implemented on a web site. As another example, if originator 102 is a financial institution, the associated TOP could be an in-branch account access terminal (like an Automated Teller Machine or ATM) or a funds transfer web site. Furthermore, in some embodiments, an originator account at originator 102 may be accessed through a TOP associated with originator 102 (and may then be referred to as a "TOP user account").

In some embodiments, originator 102 may also store a Payment Instrument Key (PIK) associated with an account referenced by initiating user 101. In some embodiments, a PIK may be generated by payment network 105 or another entity, using a key associated with originator 102 and a key associated with receiver 107. Originator 102 can utilize the PIK in generating financial services transaction requests on behalf of initiating user 101.

Processor 103 may be programmed to receive financial services transactions from originator 102. Processor 103 may be implemented as a device specially programmed to receive financial services transaction requests, determine an appropriate payment network for forwarding the transaction requests, and forward the transaction requests to the determined payment network. Processor 103 may receive settlement requests on behalf of originator 102, reformat messages destined for and received from the payment network into messages that can be processed by originator 102 in its format, maintain databases on behalf of originator 102 (containing, for example, data on users and/or associated accounts), process exception items on behalf of originator 102, or the like. In some embodiments, processor 103 and originator 102 may have a contractual relationship with one another and/or with payment network 105.

In some embodiments, payment network 105 is an interbank network, which enables a variety of devices, such as Automated Teller Machines (ATMs), mobile wallet providers, Point Of Sale (POS) devices, merchants, TOPs, or the like, to communicate with one another and to access financial institution accounts. Payment network 105 can be, for example, regional, national, or international in scope. Payment network 105, in some embodiments, sends financial services transactions to receiver processor 106 or receiver 107 to request validation of account ownership, balance information, or the holding, posting, or transferring of funds associated with a financial transaction and its respective account holders.

In some embodiments, payment network 105 performs settlement processes as part of processing financial services transactions. In some embodiments, when payment network 105 receives transaction requests, payment network 105 calculates the amounts that need to be transferred between the parties and will "settle" the net of those amounts. As an example, if initiating user 101 initiates a transaction to pay a second user $100.00 and the second user initiates a transaction to pay initiating user 101 $80.00, payment network 105 will combine the two transaction amounts to determine a net settlement amount representing the amount of money that must be debited and credited to the financial institutions representing each user. In this example, each financial institution credits (or "posts") the full amount of each separate transaction, i.e. the example $100.00 and $80.00, to each user's respective account, and payment network 105 will initiate a debit entry of $20.00 to one financial institution and a credit entry of $20.00 to the other financial institution to effect the appropriate net settlement between the two parties. Payment network 105 causes the funds to move between the parties by preparing Automated Clearing House (ACH) files that are initiated through an ACH bank associated with payment network 105 to each user's respective financial institution, issuer processor, merchant/merchant processor, EFT network, remittance platform, or the like. These ACH files reflect the net settlement amounts to be settled between the various parties involved in the transaction flow. Each user's account balance is debited or credited as a result of approved on-line transaction requests. In some embodiments, settlement entries in such ACH files are created at the conclusion of a particular period of time, such as, for example, a 24-hour period between 3:30 PM local time on one day and 3:30 PM on the next day.

In some embodiments, payment network 105 performs a translation process for routing a financial services transaction request to a financial institution or other receiver. Based on the information in a received financial services transaction request, payment network 105 can determine whether additional or alternative information is needed to route the request. For example, if the financial services transaction request includes an AAT (Account Access Token) associated with initiating user 101, and the transaction request indicates the use of the "X-REF mode," payment network 105 may use a database 105A to determine an RTN and account number associated with initiating user 101 based on the AAT in the financial services transaction request. Payment network 105 can also use database 105A to determine an account identifier that does not contain an account number but is associated with the account referenced in the financial services request.

If the received financial services transaction includes an RTN and account number and indicates the use of the "native mode," payment network 105 may use database 105A to determine whether the received RTN and account number are associated with an alternative RTN or account number. Payment network 105 may also determine that the financial services transaction request was not generated in either X-REF mode nor does it require an alternative RTN or account number, and may presume that the received RTN and account number are the actual numbers associated with the account of initiating user 101. In such a situation, payment network 105 can route the financial services transaction request to another payment network (not pictured) for processing.

Payment network 105, in some embodiments, also generates keys for use in processing financial services transaction requests. For example, payment network 105 may generate a Service Provider Master Key (SPMK) corresponding to originator 102 or an associated Transaction Origination Point (TOP), may utilize the SPMK to generate a Participant Authentication Key (PAK) associated with a financial institution (such as receiver 107), and may utilize the PAK to generate a Payment Instrument Key (PIK) associated with an account at the financial account (such as an account owned by initiating user 101). In some embodiments, payment network 105 may comprise a Hardware Security Module (HSM) to generate and store these keys. The HSM may be implemented in hardware, software, firmware, or a combination thereof.

Receiver processor 106 is an entity that receives financial transaction requests from payment network 105. In some embodiments, receiver processor may be implemented as a payment gateway or Electronic Funds Transfer network programmed to forward financial services transactions to receiver 107. Receiver processor 106 receives a financial services transaction, determines the appropriate receiver (such as a financial institution or the entity that holds the account information, or the like), and sends the financial transaction request to that receiver. In some embodiments, receiver processor 106 enables communication with the financial institutions or other account holder companies contracted with receiver processor 106 for on-line transaction processing services.

Receiver 107 represents an entity that receives a financial services transaction request. In some embodiments, receiver 107 is a financial institution. Financial institutions include, for example, banks, savings banks, credit unions, brokerage firms, or mutual fund providers. Financial institutions can, for example, process transactions or transfer money between accounts at the financial institution and/or accounts outside of the financial institution. Unlike payment networks, financial institutions manage accounts on behalf of users, for example, by maintaining records of deposits and withdrawals on the account, and maintaining a record of a balance on the account.

In some embodiments, receiver 107 receives financial services transaction requests directly from payment network 105. In other embodiments, receiver 107 receives financial services transaction requests from receiver processor 106, which receives them from payment network 105.

In some embodiments, receiver 107 initiates financial services transaction requests that include exception requests. For example, receiver 107 can generate and send financial services transaction requests including a chargeback exception request (indicating that a financial services transaction request corresponding to a debit or credit was in error, and should be reversed or refunded, in whole or in part) or chargeback reversal exception requests (indicating that a chargeback exception request initially initiated by an originator was in error and should be reversed).

Customer Information File (CIF) 107A contains, for example, information about accounts held by receiver 107. (An account is "held" by receiver 107 if the account and/or its funds are maintained by receiver 107.) CIF 107A includes account owner information such as names, addresses, zip codes, dates of birth, social security numbers/taxpayer identification numbers, phone numbers, email addresses, workplace addresses, driver's license numbers, token information, usernames/passwords, or the like. Receiver 107 uses CIF 107A to validate/authenticate ownership of accounts held by receiver 107, upon request by an entity such as originator 102.

Outside receiver 109 represents a receiver located in a country different from the country that payment network 105 is located in. Outside receiver 109 communicates with payment network 105 directly or through its outside receiver processor 108. Payment network 105 may enable international financial services transaction requests to be processed (e.g., a request for a credit from initiating user 101 to an account at outside receiver 109). Outside receiver processor 108, which may be located in a country other than the country of the payment network 105, may receive financial services transaction requests on behalf of outside receiver 109 and forward them to outside receiver 109 for processing. Outside receiver processor 108 may also represent a company that directly disburses remittances to recipients, instead of forwarding the request to outside receiver 109.

Figure 2:
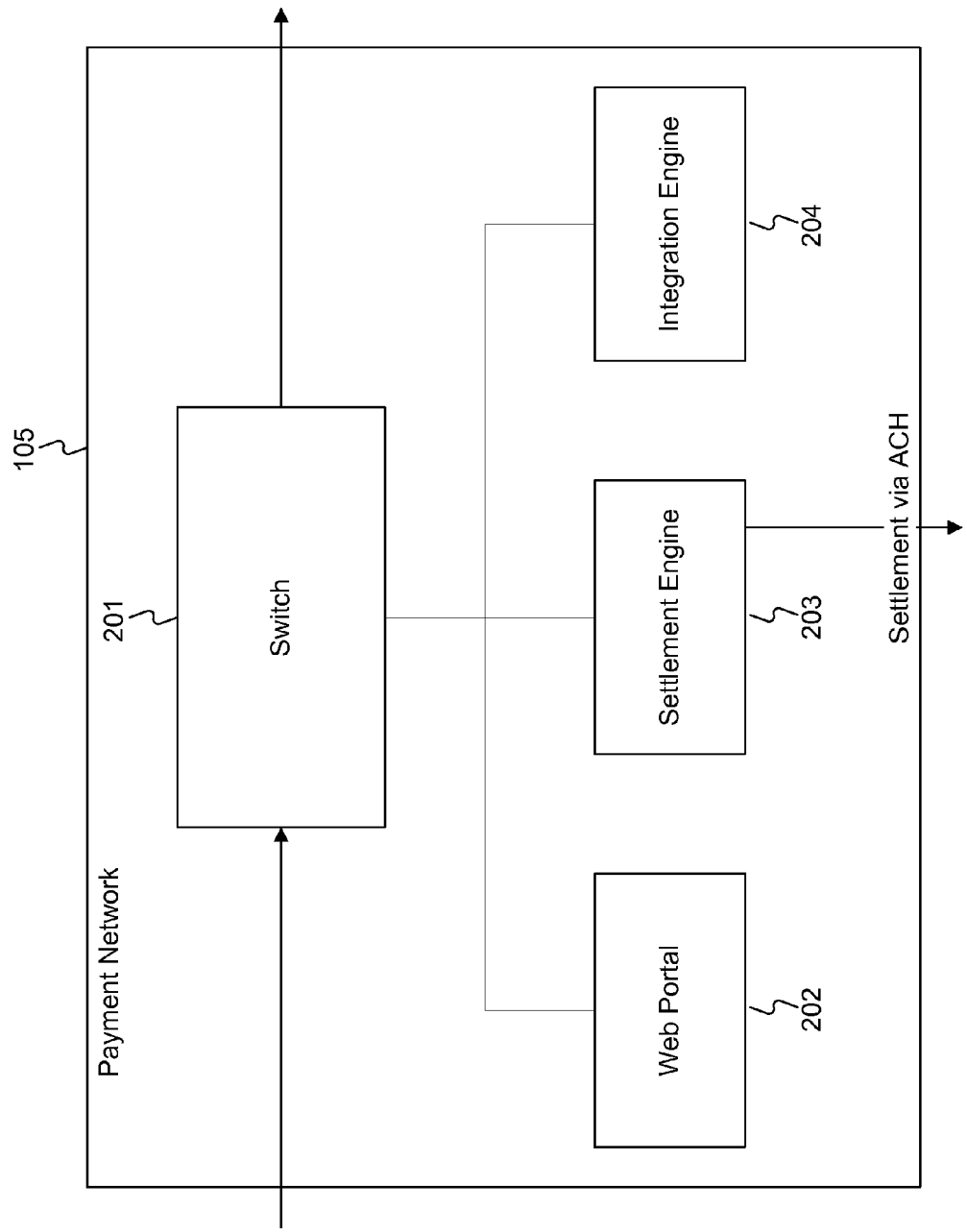
FIG. 2 illustrates embodiments of a payment network consistent with the disclosed embodiments.

FIG. 2 illustrates embodiments of payment network 105 consistent with the disclosed embodiments. Payment network 105 includes switch 201, web portal 202, settlement engine 203, and integration engine 204. Each block illustrated in FIG. 2 may be implemented using software, hardware, firmware, or a combination thereof.

Switch 201 receives financial services transactions from, for example, originators and processors. Switch 201 may be implemented using software, hardware, firmware, or a combination thereof. In some embodiments, switch 201 determines information about financial services transactions, such as, for example, the mode of a financial services transaction (e.g., X-REF or native mode) and where the request should be routed based on that information. Switch 201 may also send information to, and receive information from, any of web portal 202, settlement engine 203, and integration engine 204. Switch 201 also may receive transactions originating from devices such as Automated Teller Machines (ATMs) or POS devices, communicate with other payment networks (e.g., for forwarding financial services transactions or receiving forwarded financial services transactions), or the like. In some embodiments, switch 201 may be implemented using electronic funds transfer payments software on a fault-tolerant, self-healing platform. For example, switch 201 may be implemented using FIS CONNEX software implemented on the HP NONSTOP platform.

Web portal 202 is an access point for originators, processors, receiver processors, receivers, outside receiver processors, or receivers, to initiate and receive exception requests, retrieve files sent by payment network 105, or access supporting documentation published by payment network 105. Web portal 202 enables originators and receivers to retrieve reports on activity conducted using payment network 105. For example, originators and receivers can retrieve daily settlement reports, exception transaction reports and fee invoices. Originators, receivers and processors can also view transaction history, transmit negative files (indicating, for example, particular users that should be blocked from receiving or sending communications over payment network 105), or the like. Web portal 202 may be implemented using software, hardware, firmware, or a combination thereof.

Settlement engine 203 enables switch 201 to settle transaction requests received from originators and processors. In some embodiments, settlement engine 203 performs a periodic settlement process, in which settlement engine 203 calculates, based on approved transactions, the net amounts that need to be transferred between the parties, and generates an ACH file with entries corresponding to the net amounts that require funds to be moved between settlement accounts. Settlement engine 203 then generates the ACH file and related reports. The ACH file is sent to an ACH bank associated with payment network 105 for settlement. Related reports are made available for retrieval and are transmitted to the appropriate parties or are made available through web portal 202.

In some embodiments, settlement engine 203 performs such settlement processes on a daily basis for all transaction requests received during a particular 24-hour period. For example, at 3:30 PM Eastern Standard Time on each day, settlement engine 203 may perform settlement processes for all transaction requests requiring funds movement (including exception transactions) received since 3:30 PM Eastern Standard Time on the day before. Settlement engine 203 may then generate an ACH entry file indicating the net results of the settlement process.

Settlement engine 203 may receive transaction messages from switch 201. These transaction messages may be received in real-time, periodically in batches throughout the day, or at the end of a 24-hour period. Settlement engine 203 may also perform integrity checks on those transaction messages and prepare ACH files corresponding to calculated "net settlement" values. Net settlement means that for every debit entry in one settlement account, there is a corresponding credit entry in at least one other settlement account.

Settlement engine 203 may be implemented using software, hardware, firmware, or a combination thereof. In some embodiments, settlement engine 203 may be implemented using electronic funds transfer settlement software on a mainframe platform. For example, settlement engine 203 may be implemented using FIS CONNEX software implemented on the IBM platform.

Integration engine 204 may be a system (such as a device or software) for integrating and aggregating information from a variety of sources. Integration engine 204 may enable switch 201 to communicate with a variety of other services that are not necessarily implemented as part of payment network 105. For example, integration engine 204 may provide communication with fraud and compliance systems, third-party payment providers, bank teller systems, person-to-person payment systems, or the like. Integration engine 204 may enable interconnectivity of third-party applications, published services, and payment network 105. Integration engine 204 may also be programmed to enable auditing, logging, monitoring, routing, and security processes related to processing data from these sources, third-party applications, and payment network 105. Integration engine 204 may be implemented using software, hardware, firmware, or a combination thereof.

Figure 3:
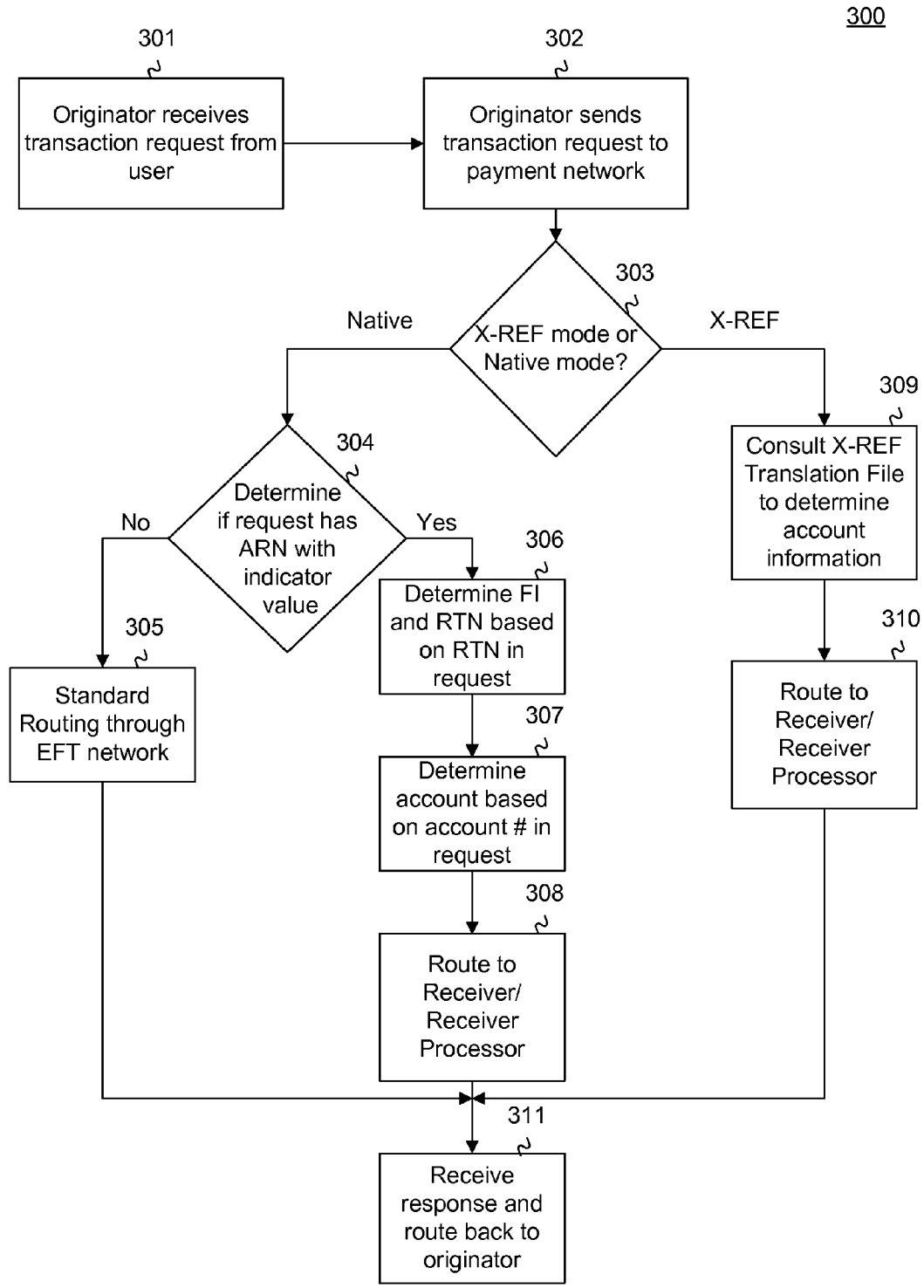
FIG. 3 illustrates an example process for processing a transaction request at a payment network, consistent with the disclosed embodiments.

FIG. 3 illustrates an example process 300 for processing a financial services transaction, consistent with the disclosed embodiments. Process 300 begins at step 301, in which originator 102 receives a transaction request from initiating user 101. For example, originator 102 can receive a transaction request from initiating user 101 to pay for a good or a service. Initiating user 101 can reference an account to use for the transaction. In some embodiments, initiating user 101 may proffer an RTN and account number associated with the account, an AAT (Account Access Token) associated with the user/account, or the like.

Originator 102 may generate a financial services transaction request including the information proffered by the user. The financial services transaction request may also include information concerning the purpose of the financial services transaction request. For example, the transaction request can include any of: a request for the current balance of an account owned by initiating user 101, a request to validate ownership of an account referenced by initiating user 101, a request to deposit funds in an account referenced by initiating user 101, a request to withdraw funds in an account referenced by initiating user 101, or the like.

In step 302, originator 102 sends the generated financial services transaction request to payment network 105. In some embodiments, originator 102 sends the request to a processor (such as processor 103 in FIG. 1) for forwarding to payment network 105, but in other embodiments originator 102 sends the request directly to payment network 105.

In step 303, payment network 105 determines whether the financial services transaction request was generated using X-REF mode or using native mode. Payment network 105 makes this determination based on the information contained in the financial services transaction request. For example, if the request contains an RTN number, a bank account number, part of a bank account number, a card-like number, or other numbers, indicating that the financial services transaction request was generated in native mode, payment network 105 can determine that the request was generated using native mode, and can proceed to step 304 for further processing of the request. Otherwise, if payment network 105 determines that the financial services transaction request includes an AAT (Account Access Token), such as a username, personally-identifying information (e.g., a social security number, name, address, email address, phone number, or the like), a substitute account number (e.g., an account number that resembles a valid account number but is not the actual account number for the account), or the like, payment network 105 can determine that the request was generated using X-REF mode, and can proceed to step 309 for further processing of the transaction.

If payment network 105 determines that the request was generated using native mode, then, in step 304, payment network 105 determines whether the financial services transaction request includes an RTA (Routing Transit and Account number) with a particular indicator value. The indicator value, in some embodiments, may be stored at the beginning of the beginning of a PAN field in the request. In some embodiments, the indicator value may be chosen so as to be distinguishable from initial values associated with payment cards, to avoid confusion with payment card transactions. For example, VISA cards have a '4' at the beginning of their card numbers and AMERICAN EXPRESS cards have a '3' at the beginning of their card numbers. The indicator value can be chosen to avoid confusion with other card providers. In some embodiments, the indicator value is '59.'

If the received financial services transaction request does not include an RTA with the indicator value, then process 300 may continue to step 305, in which payment network 105 forwards the financial transaction request to an Electronic Funds Transfer (EFT) or other payment network for forwarding to the ultimate destination (e.g., receiver 107). However, if in step 304 payment network 105 determines that the RTA in the financial transaction request includes the indicator value, process 300 continues to step 306.

In step 306, payment network 105 determines the appropriate financial institution based on the information received in the financial services transaction request. There are multiple ways to determine the appropriate financial institution. For example, payment network 105 may determine the financial institution based on an RTN included in the financial services transaction request. As another example, payment network 105 may consult a database (such as database 105A in FIG. 1) to determine a substitute RTN corresponding to data in the request. Once payment network 105 determines the appropriate RTN, process 300 proceeds to step 307.

In step 307, payment network 105 determines an account number associated with the initiating user based on information received in the financial services transaction request. There are multiple ways to determine the appropriate account number. For example, payment network 105 may determine that the entire account number is contained in the request. As another example, the financial services transaction request may only include a part of the account number, such as the leftmost eight digits. In that case, payment network 105 may consult a database (such as database 105A in FIG. 1) to determine the remaining digits of the account number. As another example, the account number contained in the request may include a non-existent account number and/or a substitute for the actual account number. In those situations, payment network 105 may consult database 105A to determine a substitute account number.

In some embodiments, step 307 represents payment network 105 determining an account identifier associated with the ARN and the account. In some embodiments, this account identifier does not contain an account number associated with the account. A receiver that manages the account stores a correspondence between the account identifier and an actual account number associated with the account (stored, for example, in association with one another in a database).

Once payment network 105 determines the appropriate account number or account identifier, process 300 proceeds to step 308. In step 308, payment network 105 generates a new financial services transaction request. This request includes information from the received financial services transaction request and any determined substitute RTN, account numbers, or account identifiers. Payment network 105 sends the generated financial services transaction request to the receiver/receiver processor associated with the determined RTN.

If, in step 303, payment network 105 determines that the financial services transaction request was generated using X-REF mode, process 300 continues to step 309. In step 309, payment network 105 consults a translation file to determine the account information associated with the financial services transaction. In X-REF mode, the financial services transaction request includes identifying information that is associated with an account number and/or an RTN. However, neither the RTN nor the account number is included in the financial services transaction. Instead, identifying information may be in the form of an AAT (Account Access Token). An AAT enables identification of a user's account at a financial institution without the account number associated by the financial institution. AATs include identifying information such as a username, personally-identifying information (e.g., a social security number, name, address, email address, phone number, or the like), or the like.

Payment network 105 may consult a translation file to determine an RTN and account number pair associated with the AAT in the financial services transaction. In some embodiments, the translation file may be stored in a database accessible by payment network 105 (such as database 105A in FIG. 1).

In some embodiments, step 309 represents payment network 105 determining an account identifier associated with the AAT and the account. In some embodiments, this account identifier does not contain an account number associated with the account. A receiver that manages the account stores a correspondence between the account identifier and an actual account number associated with the account (stored, for example, in association with one another in a database).

Process 300 may then proceed to step 310. In step 310, payment network 105 generates a financial services transaction. This transaction may include information from the received financial services transaction and the determined RTN and account number or a determined account identifier. Payment network 105 then sends the generated financial services transaction to the determined receiver.

Regardless of the information in the financial services transaction request received in step 302, in step 311, payment network 105 receives a response from the receiver determined in one of steps 305, 308, or 310. The response may include information relating to the financial services transaction request and may represent an "answer" from a receiver processor, a receiver, an outside receiver, or an outside receiver processor relating to the account referenced in the request.

The response includes one or more indications concerning the account. Types of possible indications may include: an indication that the available balance is less than (or more than) the amount in the transaction request; an indication that the ledger balance is less than (or more than) the amount in the transaction request (the ledger balance differing from the available balance by any pending debits or credits on the account); an indication of the actual current ledger or available balance; an indication of the health of the account (e.g., whether the account is open and/or in good standing); an indication of how long the account has been open for; an indication of any negative history associated with the account; average balance ranges; an indication of validation of identity/account ownership information provided by an initiating user; data indicating the account owner's name, address, or a date the account was opened; or other information about the owner or account.

Figure 4A:
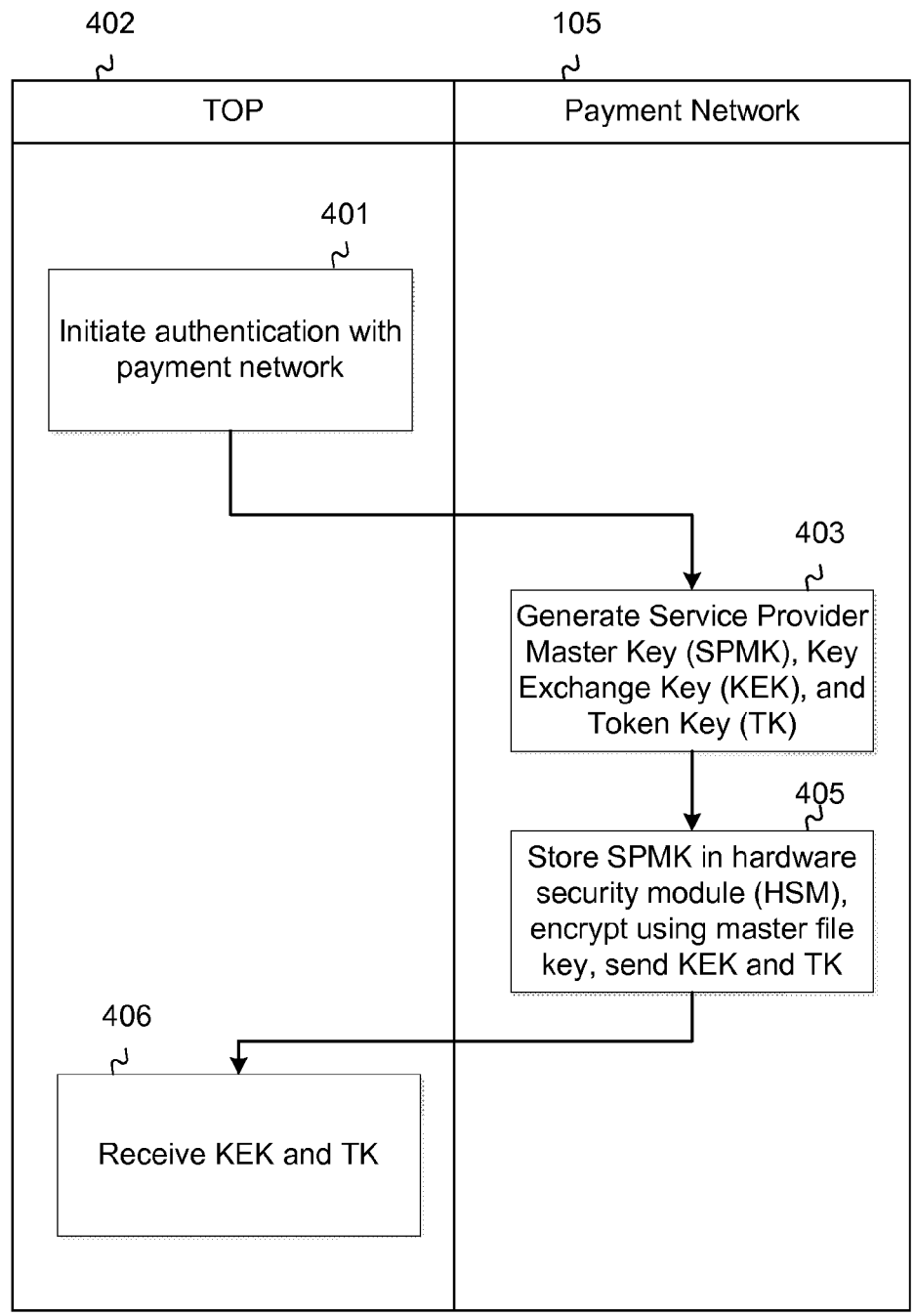
FIG. 4A illustrates an example process for initializing keys necessary for a Transaction Origination Point (TOP) to operate in conjunction with a payment network, consistent with the disclosed embodiments

FIG. 4A illustrates an example process 400 for initializing keys necessary for a Transaction Origination Point (TOP) 402 to operate in conjunction with payment network 105, consistent with the disclosed embodiments. TOP 402 represents a device or mechanism by which an originator (such as originator 102 in FIG. 1) receives data concerning a user, for the purpose of processing a transaction initiated by the user using payment network 105.

Each originator may have one or more of TOP 402 associated therewith for use in processing transactions initiated by users. So, for example, if an originator provides a mobile wallet for use by users, TOP 402 could be a wallet provider system that receives instructions to pay for a purchase. As another example, if the originator is a wireless service provider, TOP 402 could be a bill payment website or a mobile bill payment application. As another example, if the originator is a financial institution, TOP 402 could be a teller station, a kiosk, an in-branch account access terminal (like an Automated Teller Machine or ATM) or a funds transfer website.

Process 400 enables TOP 402 to set up an authenticated relationship with payment network 105 in a secure manner. This relationship enables those associated with TOP 402, such as users, merchants, remittance platforms, EFT networks, or financial institutions, to securely initiate financial transactions with payment network 105 using TOP 402. In step 401, TOP 402 sends a request to payment network 105 to request the initiation of an authenticated connection between TOP 402 and payment network 105.

In some embodiments, the request sent in step 401 also includes a request to set up a Key Exchange Key (KEK) for use in exchanging information between TOP 402 and payment network 105. TOP 402 and payment network 105 can implement a process for establishing the KEK. For example, TOP 402 and payment network 105 can implement the known Diffie-Hellman key exchange algorithm. However, no particular method of system for generating a KEK is required in all embodiments.

Process 400 then proceeds to step 403. In step 403, payment network 105 generates a Service Provider Master Key (SPMK). TOP 402 has a unique SPMK generated by payment network 105. In some embodiments, the SPMK may be generated using a random or pseudorandom number generator or a key generation algorithm. Additionally, in some embodiments, no two TOPs would have the same SPMK. However, in other embodiments, TOPs associated with the same originator could share a SPMK.

In step 403, payment network 105 may also generate a KEK. The KEK may be utilized to securely exchange information between TOP 402 and payment network 105, and may be generated using a random or pseudorandom number generator or a key generation algorithm. Payment network 105 may also generate a Token Key (TK). The TK enables TOP 402 to encrypt certain elements in a financial services transaction request. In some embodiments, the TK could be used to encrypt data elements for which distribution should be limited (such as an account number, account identifier, PAN, or other sensitive information).

In step 405, payment network 105 encrypts and stores the generated SPMK in a Hardware Security Module (HSM). In some embodiments, the HSM generates encryption and decryption keys, stores encryption and decryption keys and other data, encrypts and decrypts data using stored keys, and generates a "Master File Key" (MFK) for encrypting other encryption and decryption keys. The HSM may be implemented in hardware, software, firmware, or a combination thereof. In some embodiments, payment network 105 may encrypt the SPMK using an MFK associated with the HSM. In step 405, payment network 105 may also store the generated KEK (or a portion thereof) and TK in the HSM. Payment network 105 may also send the KEK and TK to TOP 402, which receives it in step 406. In some embodiments, TOP 402 stores the KEK and TK in its own HSM.

Figure 4B:
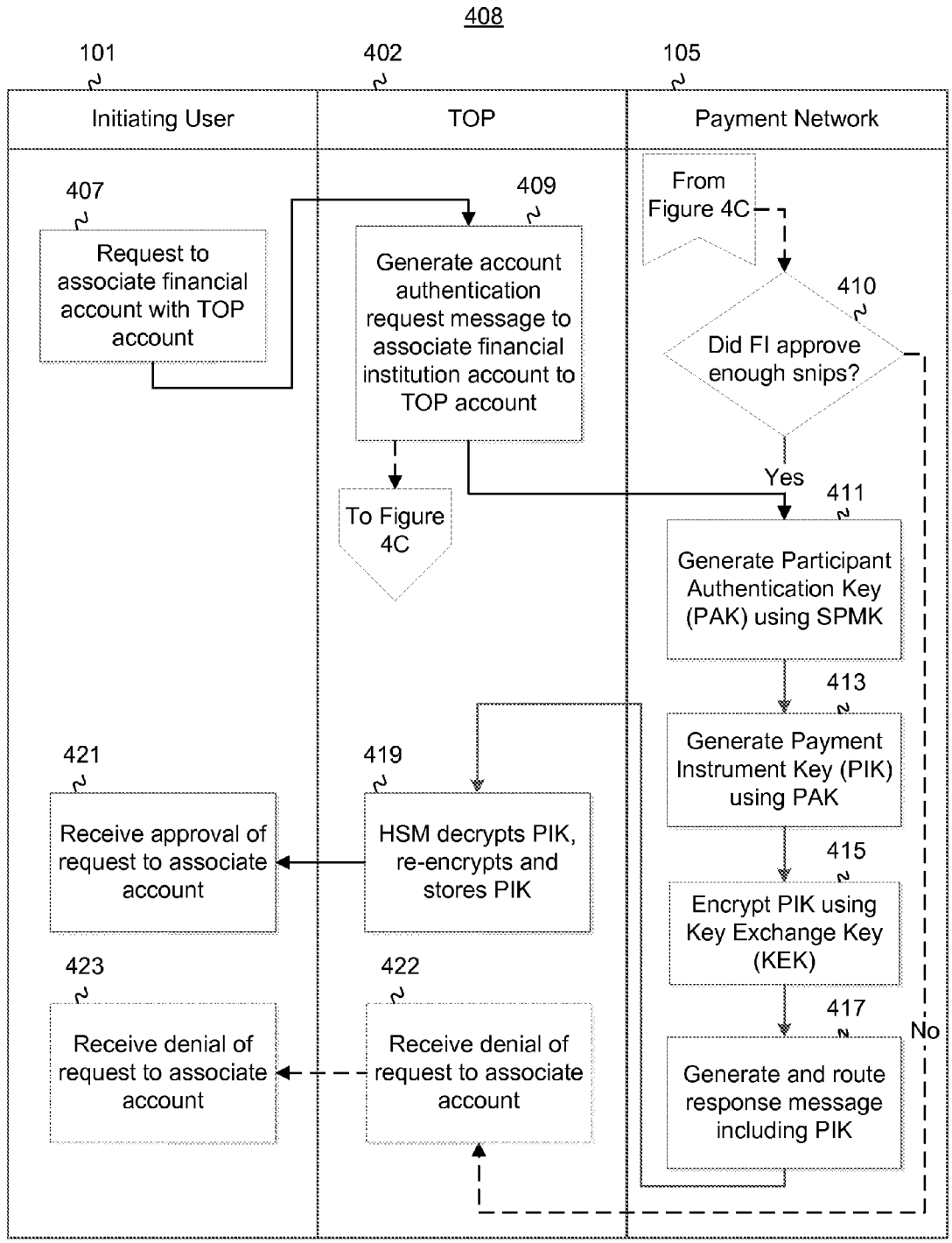
FIG. 4B illustrates an example process for associating a financial institution account to an originator user account, consistent with the disclosed embodiments.

FIG. 4B illustrates an example process 408 for associating a financial institution account with a TOP user account, in accordance with the disclosed embodiments. In step 407, initiating user 101 operates a device, such as a computer or mobile device, to associate a financial institution account (e.g., a deposit account) with a TOP user account. In step 409, TOP 402 receives the request from initiating user 101 to associate the financial institution account with the TOP user account, and generates an account authentication request message to associate the financial institution account with the TOP user account, for sending to payment network 105. The request comprises information about the financial institution account. This includes, for example, a RTN and account number pair, an RTA, a Primary Account Number (PAN) such as a card-like number, an Account Access Token (AAT), or the like. TOP 402 then forwards the account authentication request message to payment network 105.

Figure 4C:
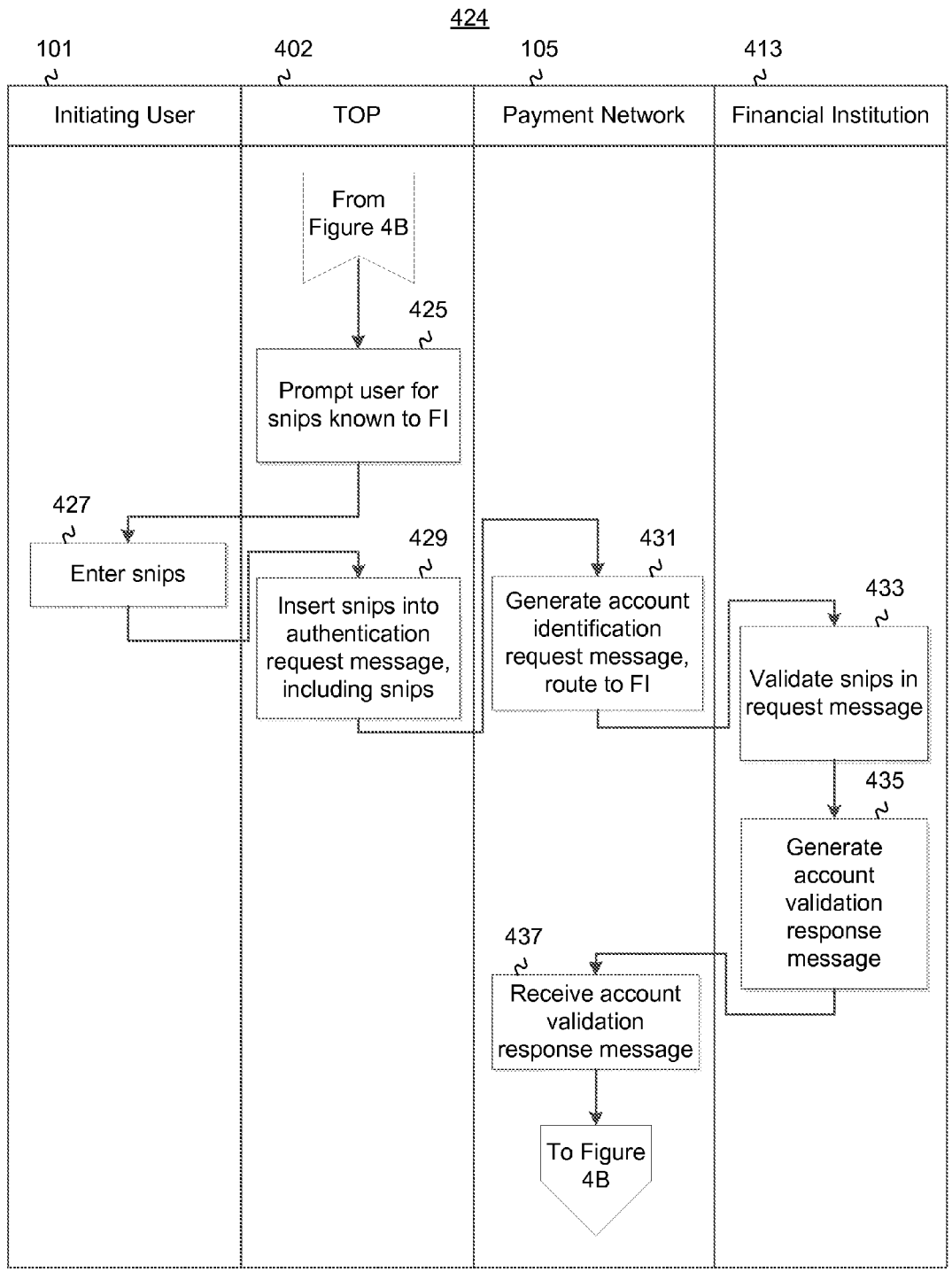
FIG. 4C illustrates an example optional process for associating a financial institution account with a user account with an initiating user.

Payment network 105 may operate an optional process, illustrated in FIG. 4C, that enables a higher level of security for user 101 and TOP 402 in associating the financial institution account with the TOP user account, (This process may be offered to TOP 402 as an optional service or for an extra fee.) If payment network 105 operates that optional process on behalf of TOP 402, the process continues to step 425 in FIG. 4C. If, however, payment network does not operate the optional process illustrated in FIG. 4C, the process instead continues to step 411.

In step 411, payment network 105 accepts and processes the account authentication request message. Payment network 105 generates a Participant Authentication Key (PAK) using a Hardware Security Module (HSM). The PAK may be generated by encrypting information about the financial institution that manages the account initiating user 101 wishes to associate with the TOP user account, using as a key a Service Provider Master Key (SPMK) stored in the HSM and associated with TOP 402. In some embodiments, this information encrypted using the SPMK includes a RTN, a Bank Identification Number (BIN), or other identifier related to the financial institution. In some embodiments, the algorithm used to encrypt and generate the PAK this information is Triple-DES (3DES).

In step 413, payment network 105 uses the HSM to generate a Payment Instruction Key (PIK). In some embodiments, the PIK can be generated by generating a keyed cryptographic hash (also known as a "Message Authentication Code" or "MAC") of information about the financial institution account, using the PAK generated in step 411 as a key. For example, the PIK can be generated by hashing a bank account number associated with the account, a PAN associated with the account, or other identifier associated with the account.

In step 415, payment network 105 encrypts the PIK using a Key Exchange Key (KEK). The KEK, in some embodiments, is agreed upon between TOP 402 and payment network 105 during an earlier process (for example, during the process illustrated in FIG. 4A).

In step 417, payment network 105 generates a response including the encrypted PIK, and sends it to TOP 402. In step 419, TOP 402 receives and processes the response message that includes the PIK. TOP 402 then decrypts the PIK using the KEK, and stores the PIK in a Hardware Security Module (HSM) operated by TOP 402. In step 421, TOP 402 sends a message to initiating user 101 indicating that the request to associate a financial institution account with the TOP user account was approved. TOP 402 can then utilize the PIK to initiate a financial services transaction request on behalf of initiating user 101.

FIG. 4C illustrates an example optional process 424 for associating a financial institution account with a user account with initiating user 101. As explained above, if payment network 105 offers the process in FIG. 4C as an optional service to TOP 402, the process will continue after step 409 in FIG. 4B. Step 425 proceeds from step 409 in FIG. 4B, during which TOP 402 receives a command to associate a financial institution account (e.g., a deposit account) with a TOP (Transaction Origination Point) user account. In response, TOP 402 generates and sends a request to initiating user 101. The request includes a prompt for particular pieces of information (referred to as "snips") known to both initiating user 101 and to financial institution 413. Example snips requested from initiating user 101 includes a current balance in the account, particular digits of a social security number/taxpayer identification number associated with initiating user 101 (such as the last five digits), a Card Verification Value (CVV) from the back of a payment card associated with the account, particular digits of a telephone number associated with initiating user 101 (such as the first three digits after the area code), a shared secret between initiating user 101 and financial institution 413 (such as a password), or the like.

In step 427, initiating user 101 receives the snips request and enters the snips on the device for sending to TOP 402. In some embodiments, the response sent in step 427 is sent in plaintext form to TOP 402. However, in other embodiments, initiating user 101 encrypts, hashes, or otherwise obfuscates the information before generating and sending the response to TOP 402.

In step 429, TOP 402 receives the response, and inserts the received snips (in plaintext, hashed, encrypted, or other form) into the authentication request message generated in step 409 of FIG. 4B along with a request to validate the snips. In some embodiments, the authentication request message comprises a data element populated with the received snips. Each snip is labeled with a "tag" indicating what it stands for.

For example, the data element may comprise of a tag indicating that the data element comprises snips corresponding to initiating user 101, a length of the data element, and then multiple information subsets, each subset corresponding to a different snip received from user 101. Each subset comprises a sub tag indicating what the information represents, a length of the snip, and a value corresponding to the snip (either in plaintext or obfuscated form). So, if a data element comprises 5 snips, the data element can be represented as:

cation request message is sent in plaintext form to payment network 105. However, in other embodiments, TOP 402 encrypts, hashes, or otherwise obfuscates the information in the authentication request message before sending it to payment network 105.

In step 431, payment network 105 receives the authentication request message, and generates an account identification request message. The account identification request message comprises data received from TOP 402, including the data element and corresponding snips. This account identification request message is sent to financial institution 413.

In step 433, financial institution 413 validates the information in the account identification request message by comparing it with information in a database associated with financial institution 413. For example, financial institution 413 can compare received information with information in a CIF ("Customer Information File") (such as CIF 107A) in FIG. 1. If the snips in the data element from initiating user 101 are in plaintext, financial institution 413 compares the data element from TOP 402 with information stored in the CIF.

If, however, the snips in the data element are in an obfuscated form, such as a hashed format, an encrypted format, or the like, financial institution 413 determines the sub tags in the data element, gathers the data corresponding to those sub tags from the CIF, and obfuscates the gathered data in the same manner that the data was obfuscated by initiating user 101 or TOP 402 (e.g., by encryption or hashing). Then financial institution 413 compares the obfuscated snips to determine whether they are identical.

Regardless of the type of comparison, in step 435, financial institution 413 generates a response indicating which snips received from initiating user 101 match data in the CIF. For example, if the first, third, and fourth snips received from initiating user 101 match data in the CIF but the second and fifth snips received from initiating user 101 do not match data in the CIF, financial institution 413 can generate a response indicating that only some of the snips match. In some embodiments, the corresponding response can be implemented as a bit map indicating which snips matched information in the CIF.

Financial institution 413 generates an account validation response message, including the generated response indicating the number of matched snips, and sends it to payment network 105. In step 437, payment network 105 receives the response message from financial institution 413, and proceeds back to FIG. 4B to step 410.

In step 410 on FIG. 4B, payment network 105 determines whether to associate the financial institution account with the TOP user account and generate a corresponding message for sending to initiating user 101. For example, payment network 105 can determine that the financial account and the

| Tag | Len | ST | L | V | ST | L | V | ST | L | V | ST | L | V | ST | L | V |
|-----|-----|----|----|----|----|----|----|----|----|----|----|----|----|----|----|----| where "Tag" indicates that the data element comprises snips corresponding to initiating user 101, "Len" represents the length of the data element, each "ST" indicates the type of information that the snip represents, each "L" represents the length of the snip, and each "V" represents the snip itself. This particular layout is provided only as an illustrative example.

TOP 402 then sends the authentication request message to payment network 105. In some embodiments, the authenti- TOP user account should be associated with one another if a majority (i.e., more than 50%) of snips provided by user 101 in step 427 matched data stored by financial institution 413. If so, the process continues to step 411, where payment network 105 generates the PAK key, as described above. If, however, payment network 105 determines that financial institution 413 did not match enough information with the snips provided by user 101, the process may continue to step 422, where the response (including, in some embodiments, a bit map or other indication of the result of matching the snips) may be forwarded to TOP 402, indicating that the request to associate the financial institution account with the TOP user account should be denied. TOP 402 then forwards a response to initiating user 101 in step 423 indicating that the request to associate the financial institution account with the TOP user account was denied.

Figure 4D:
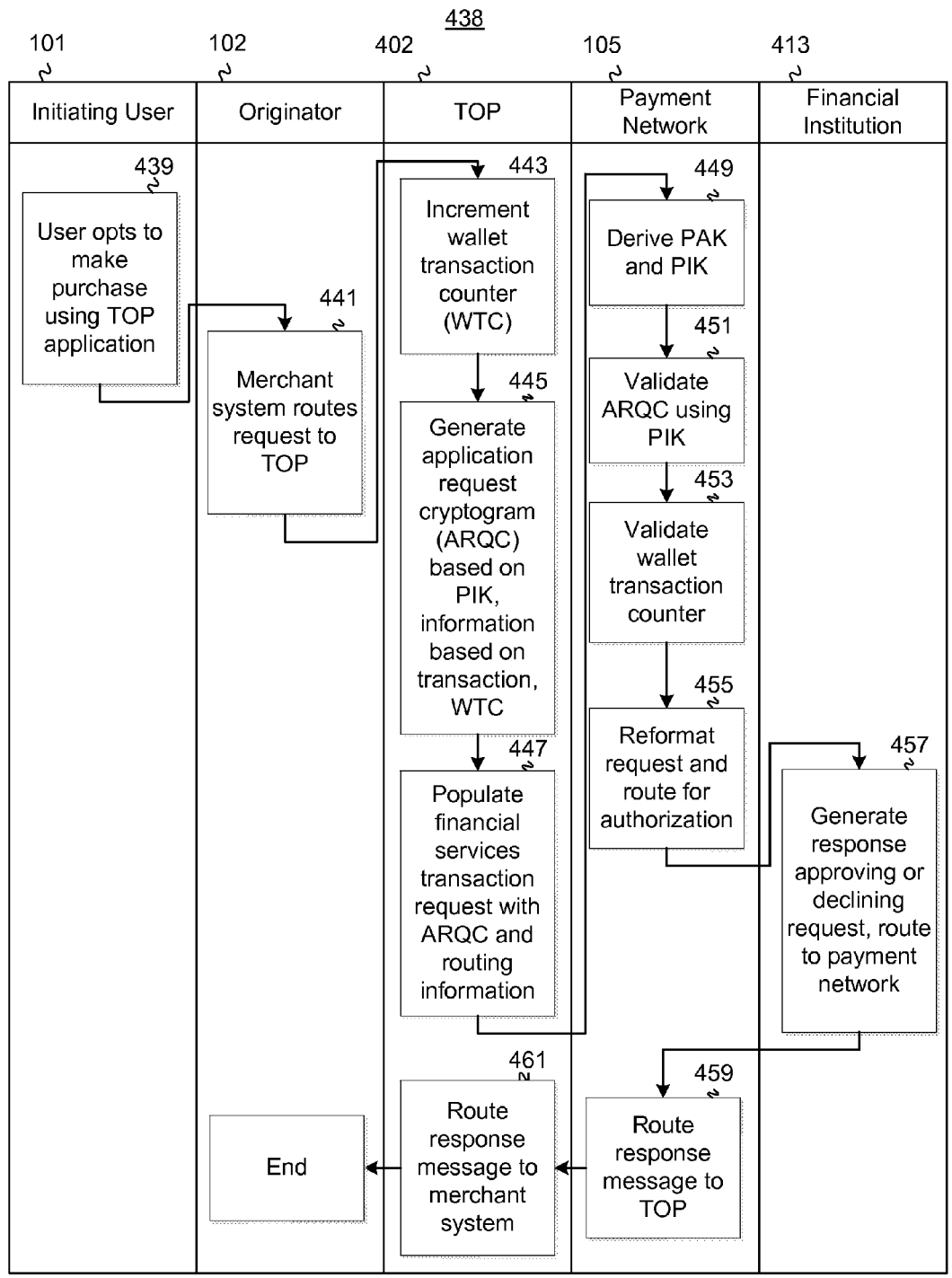
FIG. 4D illustrates an example process for using a TOP to process a transaction, consistent with the disclosed embodiments.

FIG. 4D illustrates an example process 438 for using TOP 402 to initiate a transaction request. Process 438 involves communication between initiating user 101, originator 102, TOP 402, payment network 105, and financial institution 403. The steps in process 438 enable initiating user 101 and originator 102 to accomplish a financial transaction over payment network 105, using an account at financial institution 413 (such as a deposit account) that is associated with a TOP user account at TOP 402.

A TOP application provided to initiating user 101, in some embodiments, comprises an application programmed to deliver information to a merchant or merchant terminal (such as a Point of Sale (POS) device) regarding a purchase or other financial transaction initiating user 101 wishes to make. For example, the TOP application may wirelessly transit information relating to the mobile wallet user account. The TOP application may be implemented as a mobile wallet application, a bill payment website, or the like.

In step 439, initiating user 101 utilizes a TOP application to initiate a transaction regarding a purchase. For example, the TOP application may generate a message including, a request to initiate a purchase, information about the TOP user account, the amount of money to pay, or the like, and may send it to originator 102. In step 441, originator 102 generates and sends a financial services transaction to TOP 402.

In step 443, TOP 402 receives the financial services transaction request from TOP 402, and increments a wallet transaction counter (WTC). The WTC may be used by TOP 402 and payment network to verify that the use of the TOP application and/or TOP 402 is authorized by initiating user 101.

In step 445, TOP 402 generates an Application Request Cryptogram (ARQC). In some embodiments, generating the ARQC comprises using a Hardware Security Module (HSM) to encrypt a variety of data with a Payment Instrument Key (PIK) that is associated with the user account. The data encrypted to generate the ARQC may include, for example, a code representing the currency for the transaction (e.g., "USD" or "840" for U.S. Dollar), a date associated with the transaction, the amount of the transaction, a country code associated with originator 102, the wallet transaction counter incremented in step 407, a random number, or the like. In some embodiments, the ARQC is generated to conform with the EMV specification (short for Europay, MasterCard, and Visa), which defines requirements for implementing "chip and pin" transactions using integrated circuit payment cards. In some embodiments, certain data elements included in the ARQC may be encrypted before being placed into the ARQC. For example, data elements for which distribution should be limited (such as an account number, PAN, or other sensitive information) can be encrypted using a Token Key (TK). (TOP 402 acquires a TK, in some embodiments, by receiving it in a process such as the one depicted in FIG. 4A.)

In step 447, TOP 402 generates a financial services transaction request, and populates it with the generated ARQC as well as data elements regarding the requested transaction. These data elements include, for example, information about the TOP user account or the financial institution account, an amount of money involved in the transaction, or the like. In step 447, TOP 402 forwards the message to payment network 105.

In step 449, payment network 105 derives a PIK (Participant Authentication Key) and a PAK (Payment Instrument Key). In some embodiments, the PIK and the PAK are based on the Service Provider Master Key (SPMK) associated with TOP 402. The PAK relates to financial institution 413 and is generated using the SPMK. The PIK is related to the particular account at financial institution 413 and is generated using the PAK. Thus, because the SPMK is accessible to payment network 105, payment network 105 can derive the PAK using the SPMK and can derive the PIK using the derived PAK.

In step 451, payment network 105 validates the received ARQC using the PIK. For example, payment network 105 uses the derived PIK to ensure that the ARQC was actually sent by TOP 402 (for example, by decrypting the ARQC using the PIK or by generating a duplicate ARQC and comparing it to the received ARQC). If payment network 105 validates the ARQC, process 400 continues to step 453. In step 453, payment network 105 validates the wallet transaction counter (WTC) value included in the financial services transaction request. Payment network 105 determines whether the WTC value is within an acceptable range of a previously received WTC value. For example, payment network 105 may determine whether the WTC value received in the current financial services transaction request is within three digits of a WTC value received in a previous financial services transaction request (e.g., if the WTC value in a previous financial services transaction request is 50, determine whether the WTC value in this request is between 51 and 53). If payment network 105 determines that the WTC value is within an acceptable range of the previous WTC value, process 400 continues to step 455.

In step 455, payment network 105 reformats the financial services transaction request and forwards it to financial institution 413 for processing. Financial institution 413 may be implemented as a receiver processor (e.g., receiver processor 106 in FIG. 1), a receiver (e.g., receiver 107 in FIG. 1), an outside receiver processor (e.g., outside receiver processor 108 in FIG. 1) or an outside receiver (e.g., outside receiver 109 in FIG. 1). In some embodiments, forwarding the reformatted message to financial institution 413 can comprise at least one of: forwarding the request to a receiver processor for forwarding to a receiver, forwarding the request directly to a receiver, forwarding the request to an outside receiver processor for forwarding to an outside receiver, or the like. (In some embodiments, the process in step 455 can be implemented as described above with respect to steps 303-310 in FIG. 3.)

In step 457, financial institution 413 receives the reformatted financial services transaction request and determines how to respond. For example, if the reformatted request comprises a request from originator to determine whether there are sufficient funds in an account for a purchase, financial institution 413 determines whether there are sufficient funds and generates an appropriate response. Financial institution 413 then sends payment network 105 a response to the financial services transaction request.

In step 459, payment network 105 receives, forwards, and logs the response routed to it in step 457. Payment network 105 then sends the response message to TOP 402. In step 461, TOP 402 receives, forwards, and logs the response, and forwards it to originator 102. Originator 102 accepts and processes the message and provides an appropriate response to initiating user 101. For example, if initiating user 101 attempted to purchase an item from originator 102 in step 439 and the response received in step 461 indicates insufficient funds in the account referenced by initiating user 101, originator 102 may deny the purchase transaction.

Figure 5:
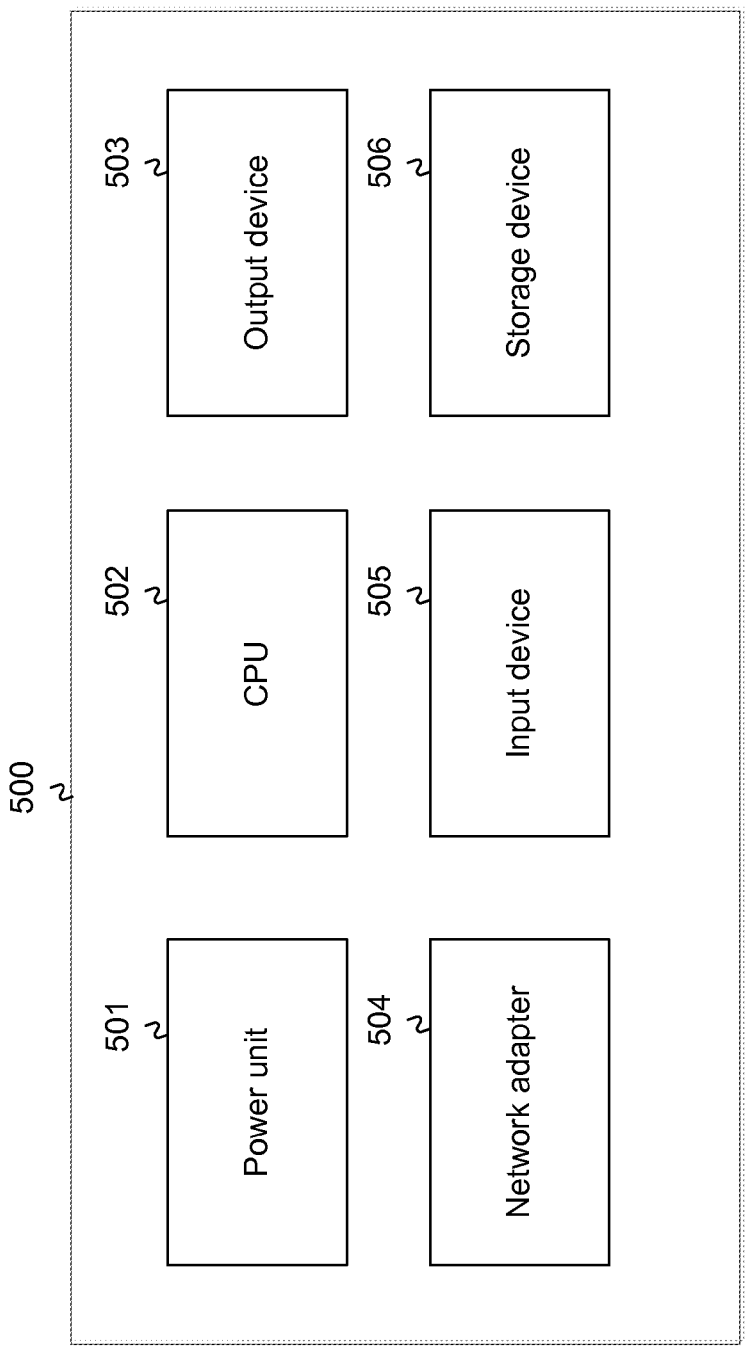
FIG. 5 illustrates an example computer system for implementing the disclosed embodiments.

FIG. 5 illustrates example computer system 500 for implementing the disclosed embodiments. Each component depicted in FIG. 1 (e.g., user 101, originator 102, processor 103, payment network 105, database 105A, receiver processor 106, receiver 107, CIF 107A, outside receiver processor 108, outside receiver 109, or CIF 109A) may be implemented as illustrated in computer system 500. In some embodiments, the components in FIG. 5 may be duplicated, substituted, or omitted. In some embodiments, system 500 can be implemented, as appropriate, as a cellular phone, a mobile device, a POS (point-of-sale) device, a server, a wireless device, or any other system that includes at least some of the components of FIG. 5.

System 500 comprises power unit 501. Power unit 501 can be implemented as a battery, a power supply, or the like. Power unit 501 provides the electricity necessary to power the other components in system 500. For example, CPU 502 needs power to operate. Power unit 501 can provide the necessary electric current to power this component.

System 500 contains a Central Processing Unit (CPU) 502, which enables data to flow between the other components and otherwise manages the operation of the other components in computer system 500. CPU 502, in some embodiments, can be implemented as a general-purpose processor (such as an Intel- or AMD-branded processor), a special-purpose processor (for example, a graphics-card processor or a mobile processor), or any other kind of processor that enables input and output of data.

System 500 also comprises output device 503. Output device 503 can be implemented as a monitor, printer, speaker, plotter, or any other device that presents data processed, received, or sent by computer system 500.

System 500 also comprises network adapter 504. Network adapter 504, in some embodiments, enables communication with other devices that are implemented in the same or similar way as computer system 500. Network adapter 504, in some embodiments, may allow communication to and/or from a network such as the Internet. Network adapter 504 may be implemented using any or all of known or as-yet-unknown wired or wireless technologies (such as Ethernet, 802.11a/b/g/n (aka Wi-Fi), cellular (e.g. GSM, CDMA, LTE), or the like).

System 500 also comprises input device 505. In some embodiments, input device 505 may be any device that enables a user or other entity to input data. For example, input device 505 could be a keyboard, a mouse, keypad on a touch screen, or the like. Input device 505 can be used to control the operation of the other components illustrated in FIG. 5.

System 500 also includes storage device 506. Storage device 506 stores data that is usable by the other components in system 500. Storage device 506 may, in some embodiments, be implemented as a hard drive, temporary memory, permanent memory, optical memory, or any other type of permanent or temporary storage device, Storage device 506 may store one or more modules of computer program instructions and/or code that creates an execution environment for the computer program in question, such as, for example, processor firmware, a protocol stack, a database management system, an operating system, or a combination thereof.

The term "processor system," as used herein, refers to one or more processors (such as CPU 502). The disclosed systems may be implemented in part or in full on various computers, electronic devices, computer-readable media (such as CDs, DVDs, flash drives, hard drives, or other storage), or other electronic devices or storage devices. The methods and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). While disclosed processes include particular process flows, alternative flows or orders are also possible in alternative embodiments.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable sub-combination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments have been described. Other embodiments are within the scope of the following claims.

What is claimed is:

1. A method for processing a transaction, comprising steps performed by a processor, the steps comprising:
   receiving, from a system associated with an originator, a request to associate an account with an originator account; and responsive thereto:
      generating an institution key by encrypting information associated with an institution associated with the account, based on a key associated with an originator;
      generating an account key by encrypting information associated with the account based on the generated institution key; and
      sending the generated account key to the system associated with the originator;
   receiving, from the system associated with the originator, a transaction request associated with an initiating user and the account, the transaction request comprising information associated with an identification of the initiating user or the account; and
      a cryptogram comprising a transaction counter and information associated with the transaction request, and being encrypted using the generated account key; and
      not including an account number associated with the account;
   in response to receiving the transaction request comprising the cryptogram, deriving the institution key and the account key using the key associated with the originator;
   decrypting the cryptogram using the derived account key;
   comparing a previously received transaction counter with the decrypted transaction counter to determine if the transaction request is authentic; and
   based on determining that the transaction request is authentic:

determining, by searching a database using the identification of the initiating user or the account, an account identifier associated with an account number of the account;

transmitting, over a network, a transaction comprising the account identifier associated with the account to a different system associated with the institution, wherein:

the transaction includes an identifier associated with the initiating user, and the institution is determined based on searching a database using the identifier associated with the initiating user;

receiving, from the system associated with the institution, a response to the transaction; and transmitting a response to the transaction request to the system associated with the originator.

2. The method of claim 1, wherein the identification comprises a substitute account identifier different from the account identifier and an indicator value, and wherein the institution and the account identifier are determined by using the substitute account identifier to search a database for the account identifier and a Routing Transit Number associated with the account.

3. The method of claim 1, wherein the originator is one of a financial institution, an Electronic Funds Transfer network, a merchant, a merchant processor, a remittance processor, a transaction origination point, or a mobile wallet provider.

4. The method of claim 1, further comprising:

determining, based on at least one transaction request received from the system associated with the originator and approved by a receiver during a period of time, a net settlement amount applicable to at least two settlement accounts; and creating at least two entries in an Automated Clearing House file that indicates a debit and credit to the at least two accounts reflecting to the net settlement amounts.

5. The method of claim 1, wherein the transaction comprises at least one of:

a request for an available balance or a ledger balance of the account;

a request for a comparison between a balance of the account and an amount in the transaction request;

a request for an indication of a health of the account; or a request for information about an accountholder associated with the account;

a request to confirm an identity of an accountholder associated with the account;

a request to authorize a debit transaction to fund a purchase, remittance, cash withdrawal, or transfer;

a request to authorize a credit transaction to deposit money into the account.

6. The method of claim 1, wherein the request to associate an originator account with an account further comprises at least one piece of information comprising information associated with at least one of the initiating user or the account; and wherein the method further comprises:

forwarding the at least one piece of information to the system associated with the institution;

responsive to forwarding the at least one piece of information, receiving an account validation response message; and determining, based on the account validation response message, whether to generate the institution key and the account key.

7. A computer system for processing a transaction, comprising:

a processor; and a memory comprising instructions that, when executed by the processor, cause the processor to perform operations comprising:

receiving, from a system associated with an originator, a request to associate the account with an originator account; and responsive thereto:

generating an institution key by encrypting information associated with an institution associated with the account, based on a key associated with an originator;

generating an account key by encrypting information associated with the account based on the generated institution key; and sending the generated account key to the system associated with the originator;

receiving, from the system associated with the originator, a transaction request associated with an initiating user and the account, the transaction request comprising:

information associated with an identification of the initiating user or the account;

a cryptogram comprising a transaction counter and information associated with the transaction request, and being encrypted using the generated account key; and not including an account number associated with the account;

in response to receiving the transaction request comprising the cryptogram, deriving the institution key and the account key using the key associated with the originator;

decrypting the cryptogram using the derived account key;

comparing a previously received transaction counter with the decrypted transaction counter to determine if the transaction request is authentic; and based on determining that the transaction request is authentic:

determining, by searching a database using the identification of the initiating user, an account identifier associated with an account number of the account;

transmitting, over a network, a transaction comprising the account identifier associated with the account to a system associated with the institution, wherein:

the transaction includes an identifier associated with the initiating user, and the institution is determined based on searching a database using the identifier associated with the initiating user;

receiving, from the system associated with the institution, a response to the transaction; and transmitting a response to the transaction request to the system associated with the originator.

8. The system of claim 7, wherein the identification comprises a substitute account identifier different from the account identifier assigned to the account and an indicator value, and wherein the institution and the account identifier are determined by using the substitute account identifier to search a database for the account identifier and a Routing Transit Number associated with the account.

9. The system of claim 7, wherein the originator is one of a financial institution, an Electronic Funds Transfer network, a merchant, a merchant processor, a remittance processor, a transaction origination point, or a mobile wallet provider.

10. The system of claim 7, wherein the instructions further cause the processor to:
- determine, based on at least one transaction request received from the system associated with the originator and approved by a receiver during a period of time, net settlement amounts applicable to at least two settlement accounts; and
- create at least two entries in an Automated Clearing House file that indicates a debit and credit to at least two settlement accounts according to the net settlement amount.

11. The system of claim 7, wherein the transaction comprises at least one of:
- a request for an available balance or a ledger balance of the account;
- a request for a comparison between a balance of the account and an amount in the transaction request;
- a request for an indication of a health of the account; or
- a request for information about an accountholder associated with the account;
- a request to confirm an identity of an accountholder associated with the account;
- a request to authorize a debit transaction to fund a purchase, remittance, cash withdrawal, or transfer;
- a request to authorize a credit transaction to deposit money into the account.

12. The system of claim 7, wherein the request to associate an originator account with an account further comprises at least one piece of information comprising information associated with at least one of the initiating user or the account; and wherein the instructions further cause the processor system to:
- forward the at least one piece of information to the system associated with the institution;
- responsive to forwarding the at least one piece of information, receive an account validation response message; and
- determining, based on the account validation response message, whether to generate the institution key and the account key.

13. A method of associating a financial institution account and an originator account comprising steps performed by a system associated with an originator, the steps comprising:
- receiving from a user device a request to associate a financial institution account with an originator account, the financial institution account being held at a financial institution;
- generating an association message comprising financial institution account details;
- sending the association message to a system associated with a payment network, and responsive thereto, receiving an association response;
- determining whether the association response includes a key associated with the financial institution account,
  - the key associated with the financial institution account being based on information associated with the financial institution account and an institution key,
  - the institution key being based on information associated with the financial institution and a key associated with the originator, and
  - if so,
    - storing the received key for use in initiating a transaction request; and
    - sending, to the user device, an indication that the financial institution account has been associated with the originator account;
- receiving a transaction request from the system associated with the originator to initiate a transaction, the request associated with a request to initiate a transaction from the user device;
- generating and sending a financial services transaction message including the received key to the system associated with the payment network, by
  - incrementing a transaction counter associated with the financial institution account;
  - generating a cryptogram based on the received key, the transaction counter, and information about the financial services transaction request; and
  - populating the financial services transaction message with the cryptogram; and
- receiving, from the system associated with the payment network, a response to the financial services transaction message.

14. The method of claim 13, further comprising:
- responsive to receiving the request to associate a financial institution account with an originator account, sending a request for at least one piece of information;
- receiving the at least one piece of information;
- generating an account identification request message including the at least one piece of information;
- sending the account identification request message to the system associated with the payment network;
- determining if the association response indicates a denial, and if so, sending a denial to the user device indicating that the financial institution account has not been associated with the originator account.

15. A computer system associated with an originator for associating a financial institution account and an originator account, comprising:
- a processor system; and
- a memory comprising instructions that, when executed by a processor system, cause the processor system to perform operations comprising:
  - receiving from a user device a request to associate a financial institution account with an originator account, the financial institution account being held at a financial institution;
  - generating an association message comprising financial institution account details;
  - sending the association message to a system associated with a payment network, and responsive thereto, receiving an association response;
  - determining whether the association response includes a key associated with the financial institution account,
    - the key associated with the financial institution account being based on information associated with the financial institution account and an institution key,
    - the institution key being based on information associated with the financial institution and a key associated with the originator, and
    - if so,
      - storing the received key for use in initiating a transaction request; and
      - sending, to the user device, an indication that the financial institution account has been associated with the originator account;
  - receiving a transaction request from the system associated with the originator to initiate a transaction, the request associated with a request to initiate a transaction from the user device;

generating and sending a financial services transaction message including the received key to the system associated with the payment network, by
incrementing a transaction counter associated with the financial institution account;
generating a cryptogram based on the received key, the transaction counter, and information about the financial services transaction request; and
populating the financial services transaction message with the cryptogram; and
receiving, from the system associated with the payment network, a response to the financial services transaction message.

16. The system of claim 15, wherein the instructions further cause the processor to:
responsive to receiving the request to associate a financial institution account with an originator account, send a request for at least one piece of information;
receive the at least one piece of information;
generate an account identification request message including the at least one piece of information;
send the account identification request message to the system associated with the payment network;
determine if the association response indicates a denial, and if so, sending a denial to the user device indicating that the financial institution account has not been associated with the originator account.

17. A method for processing transaction requests, comprising steps performed by a system associated with a transaction origination point, the steps comprising:
receiving a transaction request from the system associated with an originator, comprising a request to initiate a transaction on behalf of a user and information on a financial account, the transaction request not including an account number associated with the financial account;
incrementing a transaction counter associated with the financial account;
determining a key associated with the financial account, wherein
the key associated with the financial account is based on information associated with the financial institution account and a key associated with the financial institution that holds the financial account, and
wherein the key associated with the financial institution is based on information associated with the financial institution and a key associated with the system associated with the originator;
generating a financial services transaction message including a cryptogram, the cryptogram generated by encrypting, using the key associated with the financial account, at least one of a code representing the currency for the transaction, a date associated with the transaction, the amount of the transaction, a country code associated with the associated device, the transaction counter, or a random number;
sending the financial services transaction message to a processor system associated with a payment network; and
receiving a response from the system associated with the payment network.

18. The method of claim 17, wherein the associated device is one of a financial institution, an Electronic Funds Transfer network, a merchant, a merchant processor, a remittance processor, a transaction origination point, or a mobile wallet provider.

19. A transaction origination point for processing transaction requests, comprising:
a processor; and
a memory comprising instructions that, when executed by a processor, cause the processor to perform operations comprising:
receiving a transaction request from a system associated with an originator, comprising a request to initiate a transaction on behalf of a user and information on a financial account, the transaction request not including an account number associated with the financial account;
incrementing a transaction counter associated with the financial account;
determining a key associated with the financial account, wherein
the key associated with the financial account is based on information associated with the financial institution account and a key associated with the financial institution that holds the financial account, and
wherein the key associated with the financial institution is based on information associated with the financial institution and a key associated with the system associated with the originator;
generating a financial services transaction message including a cryptogram, the cryptogram generated by encrypting, using the key associated with the financial account, at least one of a code representing the currency for the transaction, a date associated with the transaction, the amount of the transaction, a country code associated with the associated device, the transaction counter, or a random number;
sending the financial services transaction message to a system associated with a payment network; and
receiving a response from the system associated with the payment network.

20. The system of claim 19, wherein the associated device is one of a financial institution, an Electronic Funds Transfer network, a merchant, a merchant processor, a remittance processor, a transaction origination point, or a mobile wallet provider.

21. A method for processing transaction requests, comprising steps performed by a system associated with a payment network, the steps comprising:
receiving, from a system associated with an originator, a financial services transaction request including a cryptogram, the financial services transaction request not including an account number of a financial institution account;
determining a key associated with the financial institution account;
validating the cryptogram using the key associated with the financial institution account, by
generating a second cryptogram using information stored in the transaction request;
determining whether the second cryptogram matches the received cryptogram; and
determining if the transaction counter in the received cryptogram is within a range based on a previously received transaction counter associated with the financial account;
determining an account identifier of the financial institution account;
generating a transaction request based on information stored in the cryptogram and the determined account identifier;

sending the transaction request to a system associated with a financial institution associated with the financial institution account;

receiving a response from the financial institution system; and sending a response to the financial services transaction request to the system associated with the originator.

22. The method of claim 21, wherein determining the financial institution account key comprises:

determining, using a key associated with the originator, a financial institution key associated with a financial institution holding the financial institution account; and determining, using the financial institution key, the financial institution account key.

23. The method of claim 21, wherein the originator is one of a financial institution, an Electronic Funds Transfer network, a merchant, a merchant processor, a remittance processor, a transaction origination point, or a mobile wallet provider.

24. The method of claim 21, wherein the cryptogram is based on a key associated with the financial institution account, information associated with a requested transaction, and a transaction counter associated with the financial institution account.

25. A computer system associated with a transaction processing network, comprising:

a processor; and a memory comprising instructions programmed to, when executed by a processor, cause the processor to perform operations comprising:

receiving, from a system associated with an originator, a financial services transaction request including a cryptogram, the financial services transaction request not including an account number of a financial institution account;

determining a key associated with the financial institution account;

validating the cryptogram using the key associated with the financial institution account, by generating a second cryptogram using information stored in the transaction request;

determining whether the second cryptogram matches the received cryptogram; and determining if the transaction counter in the received cryptogram is within a range based on a previously received transaction counter associated with the financial account;

determining an account identifier of the financial institution account;

generating a transaction request based on information stored in the cryptogram and the determined account identifier;

sending the transaction request to a system associated with a financial institution associated with the financial institution account;

receiving a response from the financial institution system; and sending a response to the financial services transaction request to the system associated with the originator.

26. The system of claim 25, wherein determining the financial institution account key comprises:

determining, using a key associated with the originator, a financial institution key associated with a financial institution holding the financial institution account; and determining, using the financial institution key, the financial institution account key.

27. The system of claim 25, wherein the originator is one of a financial institution, an Electronic Funds Transfer network, a merchant, a merchant processor, a remittance processor, a transaction origination point, or a mobile wallet provider.

28. The system of claim 25, wherein the cryptogram is based on a key associated with the financial institution account, information associated with a requested transaction, and a transaction counter associated with the financial institution account.

29. The method of claim 5, wherein the health of the account comprises whether the account is at least one of valid, open, or in good standing, how long the account has been open for, negative history associated with the account, or an average balance range of the account.

* * * * *